Figure 2:
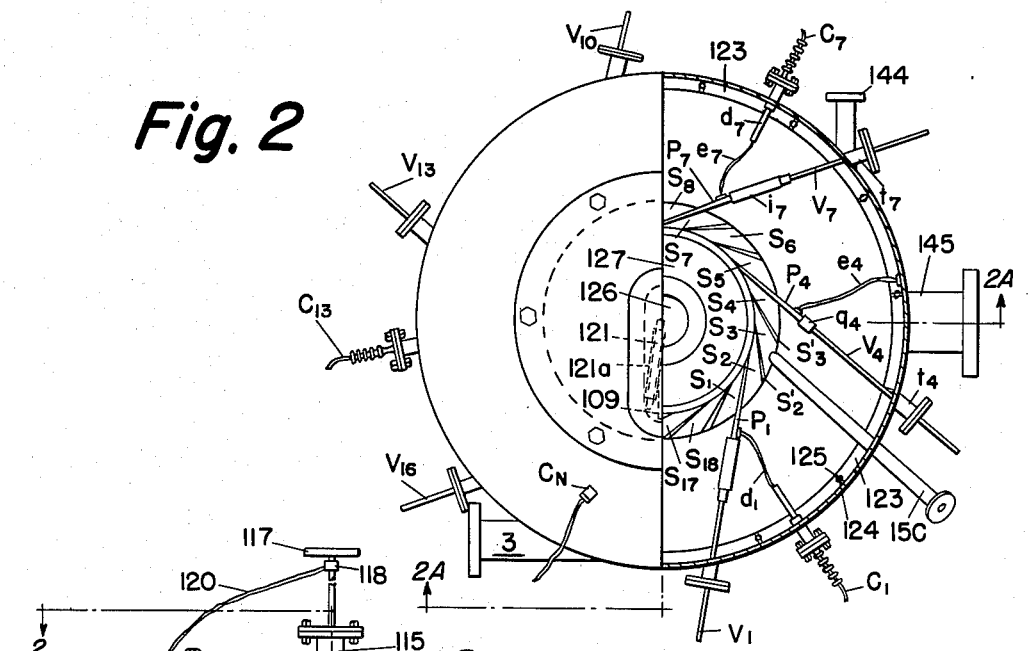

Jan. 17, 1956　　　　H. M. WEIR　　　　2,731,410
PRODUCTION OF COMPOUNDS BY MEANS OF THE ELECTRIC ARC
Filed Feb. 28, 1951　　　　　　　　　　　　4 Sheets-Sheet 1

Fig.1

*INVENTOR.*
HORACE M. WEIR
BY
*Joseph Rossman*
ATTORNEY

Jan. 17, 1956  H. M. WEIR  2,731,410
PRODUCTION OF COMPOUNDS BY MEANS OF THE ELECTRIC ARC
Filed Feb. 28, 1951  4 Sheets-Sheet 2

INVENTOR.
HORACE M. WEIR
BY Joseph Rossman
ATTORNEY

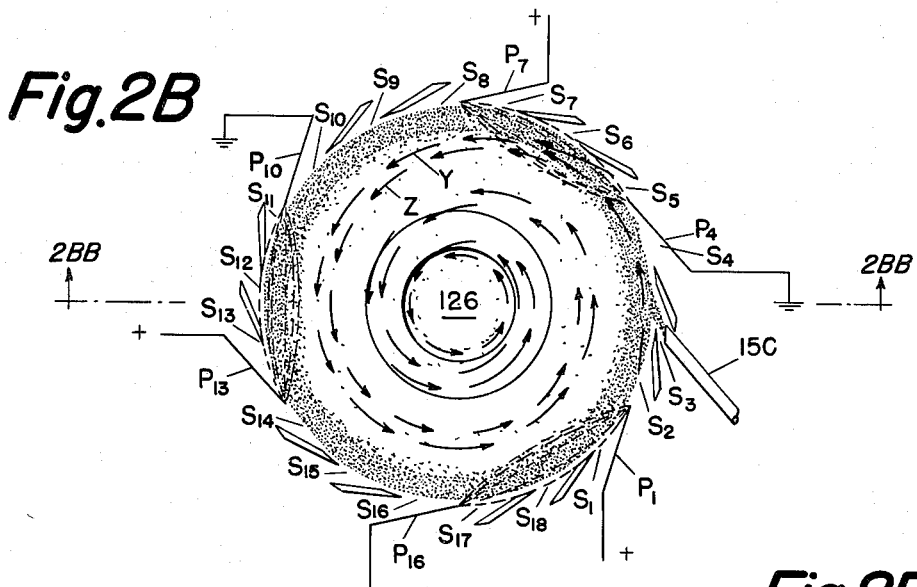
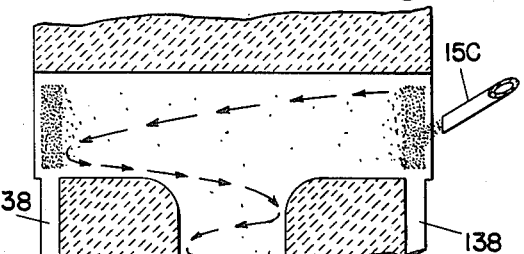
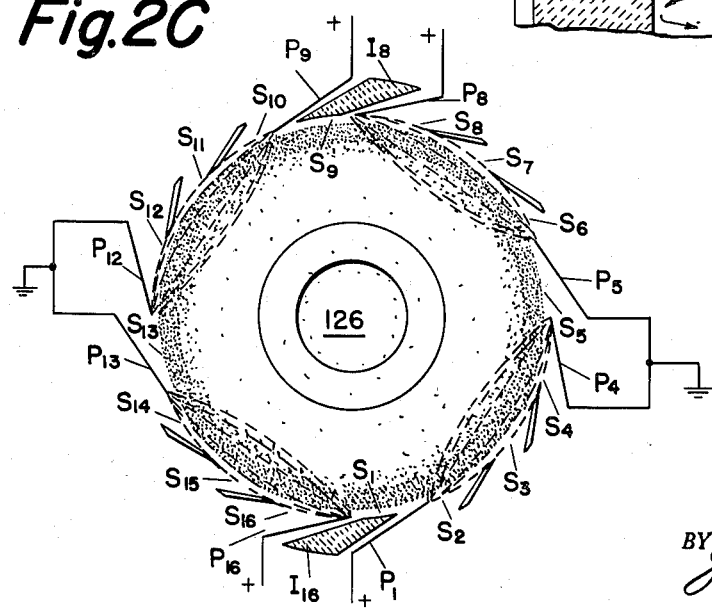

Jan. 17, 1956  H. M. WEIR  2,731,410
PRODUCTION OF COMPOUNDS BY MEANS OF THE ELECTRIC ARC
Filed Feb. 28, 1951  4 Sheets-Sheet 4

INVENTOR.
HORACE M. WEIR
BY Joseph Rossman
ATTORNEY

United States Patent Office 2,731,410
Patented Jan. 17, 1956

2,731,410

PRODUCTION OF COMPOUNDS BY MEANS OF THE ELECTRIC ARC

Horace M. Weir, Philadelphia, Pa.

Application February 28, 1951, Serial No. 213,205

25 Claims. (Cl. 204—164)

My invention relates to methods and apparatus for the production of chemical compounds from gaseous phases by means of the electric arc, and in particular to the production of acetylene and hydrocyanic acid and mixtures thereof.

The prior art teaches the manufacture of acetylene from hydrocarbons, preferably paraffinic hydrocarbons, by means of the electric arc. The following equations are useful in interpretation of the results from prior art processes and the new process as will appear. The first two equations summarize two modes of decomposition of paraffinic hydrocarbon molecules when requisite energy is supplied to them, which is, of course, the primary function of the arc. It is not typically economic to decompose all of the molecules fed into the arc but to the extent that decomposition does occur the first two equations apply. Among the other reactions which doubtless also occur, a most important recombination of decomposition products is indicated by Equation 3, a reaction which also requires energy input:

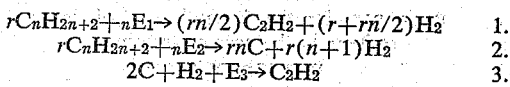

where $C_nH_{2n+2}$ is any hydrocarbon of the paraffine series.
$r=1$ or 2, as is required to make $rn$ exactly divisible by 2.
$E_1$ and $E_2$ are energy inputs for the corresponding equations each being unique for a given hydrocarbon indicated by the prescript $nE$. Energy values are conveniently expressed in B. t. u. per pound mole or kilowatt hrs./lb. mole. Values for the four simplest hydrocarbons are in Table 1.
$E_3$ a constant value=97,500 B. t. u., equivalent to 14.3 kw.-hrs. per pound carbon atom.

Recombination of the elementary products of reaction 2 is known to occur at the temperatures of the arc in the sense of Equation 3 but at lower temperatures the reaction occurs from right to left and acetylene decomposes. In the range of perhaps 1400 F. upwards for a few hundred degrees the decomposition is very rapid. Accordingly the net yield of acetylene from any arc process is critically dependent on the effectiveness and speed of cooling the product gas stream to temperatures well below the range of rapid decomposition.

That portion of the stream of hydrocarbons which is actually in the locus of the arc for an instant is subject to extremely drastic treatment and the molecules are in all probability completely decomposed to atomic carbon and atomic hydrogen. Hydrocarbon molecules which merely pass near the locus of the arc suffer less fragmentation. When methane is being treated molecular fragments such as CH, $CH_2$ and $CH_3$ are formed in all probability together with some decomposition to C and H just as occurs with the more drastically treated molecules. When higher hydrocarbons such as ethane, propane and butane are being treated complete wreckage of the more drastically treated molecules to C and H occurs together with lesser fragmentation including formation of more complicated structures than in the case of methane. Equation 1 summarizes the recombination of some of the simpler fragments to form acetylene whereas Equation 3 if written as $C+C+H+H+E_3 \rightarrow C_2H_2$ would correspond to the combination of the atoms to acetylene.

Carbon invariably appears as a product of arc action on hydrocarbon gases and can be accounted for in part by reaction according to Equation 2 and in part by the inevitable decomposition of acetylene itself represented to the reversal of Equation 3 already described. It is convenient to distinguish between the two mechanisms and term the carbon and hydrogen formed according to Equation 2, "primary hydrogen" and "primary carbon" whereas the terms secondary hydrogen and secondary carbon are reserved to indicate products of Equation 3 reversed.

As might be expected all of the products of arc action on paraffinic hydrocarbons are not accounted for by the three simple equations already given. Compounds such as olefinic hydrocarbons, methyl acetylene, vinyl acetylene, and di-acetylene also appear in the end product mixture, probably as the result of recombination of varying numbers and forms of the molecular fragments already mentioned.

Table 1 is divided into two parts. Coefficients for Equations 1, 2 and 3 as well as the energy input values when the feed gases used are pure methane, ethane propane and n-butane are given above the dotted line. These are purely theoretical data. Experimental data obtained from the operation of one of the processes of prior art using an electric arc to treat a gas blown at high velocity thru same and quenched to a lower temperature rapidly are given below the dotted line. Data for treating each of the four simplest aliphatic hydrocarbons by this system in order to yield product gases with 12 volume percent acetylene concentration are presented. While the data necessarily reflect one particular mode of operation, the yield and energy relationships are reasonably typical of quite different operations of which the writer has knowledge and may be taken as representative of what may be accomplished by prior art processing of hydrocarbons by the electric arc to yield acetylene as the chief product of interest.

Table 1, item 8 shows that only a fraction of the total gas blown thru the arc is decomposed when the 12% concentration of acetylene (item 10) in the products is achieved but that the volume of the gas products increases substantially (item 9). It is obviously most illuminating to focus attention on that portion of the feed stock which decomposed in the operation, considering the undecomposed fraction to be inert. This assumption does not rule out the possibility that some decomposition of feed stock and subsequent recombination to the same molecular species occured, but simply recognizes that the stoichiometry and overall heat relationships are not effected thereby. (Heat energy may have been transported from a hotter to a cooler portion of the reaction zone by this mechanism of decomposition and subsequent recombination.)

TABLE 1

| Item: | Methane | Ethane | Propane | Butane |
|---|---|---|---|---|
| 1. Feed stock | Methane | Ethane | Propane | Butane. |
| 2. Value of $n$ | 1 | 2 | 3 | 4. |
| 3. Value of $r$ | 2 | 1 | 2 | 1. |
| 4. $_nE_1$, Thous. B. t. u./lb. mole | 161.5 | 133.9 | 383.0 | 249.0. |
| 5. $_nE_2$, Thous. B. t. u./lb mole | 64.4 | 36.5 | 89.6 | 53.8. |
| 6. $_nE_1$ kw.-hrs. per lb. C Atom | 23.7 | 19.6 | 18.7 | 18.2. |
| 7. $_nE_2$ kw.-hrs. per lb. C Atom | 9.45 | 5.35 | 4.38 | 3.94. |
| 8. Vol. percent of feed decomposed | 44.6 | 35.0 | 30.2 | 27.5. |
| 9. Total Product Volume, percent of feed | 134 | 148 | 150 | 151. |
| 10. Volume Percent Acetylene in Products | 12.0 | 12.0 | 12.0 | 12.0. |
| 10a. Feed Req'd/Feed Theory for $C_2H_2$ | 1.23 | 1.37 | 1.41 | 1.42. |
| 11.[1] Vol. $C_2H_2+H_2$, Percent of Decomp. Product | 97.9 | 96.1 | 91.2 | 88.2. |
| 12.[1] Wt. Percent $C_2H_2+H_2$, Percent of Decomp. Product | 88.0 | 54.0 | 40.8 | 30.6. |
| 13.[1] Wt. Percent C (carbon) into $C_2H_2$ | 83.4 | 51.0 | 39.3 | 32.6. |
| 14.[1] Wt. Percent Hydrogen into $C_2H_2$ | 20.7 | 16.7 | 14.7 | 13.1. |
| 15. Energy Input, kw.-hrs./lb. $C_2H_2$ made | 5.26 | 3.79 | 3.53 | 3.35. |
| 16. Energy Input, kw.-hrs./lb. $C_2H_2$ Theoretical | 1.82 | 1.51 | 1.44 | 1.40. |
| 17. Energy Input, Actual/Theoretical | 2.89 | 2.5 | 2.45 | 2.39. |

[1] Items 11, 12, 13 and 14 refer to decomposed feed stock only, not total feed stock.

TABLE 2

*Unutilized hydrogen*

| Feed Stock | A Theory,[1] Vol./Vol. used | B Experimental, Vol./Vol. used | Ratio B/A |
|---|---|---|---|
| Methane | 3.0 | 3.95 | 1.31 |
| Ethane | 2.0 | 3.12 | 1.56 |
| Propane | 1.66+ | 2.24 | 1.35 |
| Butane | 1.5 | 1.57 | 1.04 |

[1] The ratio A according to Equation 1 should be $=(1+2/n)$.

Focusing attention on that portion of each of the several feed stocks which was actually decomposed it may be noted (item 10) that substantial excess amounts, over that theoretically required by Equation 1 to form acetylene, are necessary in all cases, the more complicated molecules being less efficient in acetylene production from the standpoint of material utilization, at the particular energy input levels necessary to yield 12% vol. acetylene in product gases. (Increase of energy input, at least up to 175% of that involved in these data when reckoned per unit of weight of feed gas, makes no appreciable change in efficiency of material utilization. More feed gas is decomposed and more acetylene is made at only slight increase in energy per pound of acetylene.) Item 12 of Table 1 shows that the volume correspondence of experimental data with the requirements of Equation 1 (item 11) actually masks a very substantial conversion of all feed stocks to relatively low volume but high weight by-product hydrocarbons. The conclusion is bourne out by reference to the efficiency of conversion of both carbon and hydrogen to acetylene (items 13 and 14 respectively). However in the case of methane at least the efficiency of carbon conversion (item 13) is great enough to indicate that little improvement can be expected with any system of operation of the general character of all prior art in electric arc application. This is all the more evident when it is recalled that part of the carbon found in the cooled products is unquestionably secondary carbon, or carbon resulting from decomposition of acetylene which actually was formed in the arc.

The invention disclosed herein provides for very significant changes in the application of the arc to acetylene production and the basic reasons for the improvements which are achieved can be developed from the data already given. It is again emphasized that while these data are specific to one form of application of the electric arc to manufacture of acetylene the differences between the yield relationships shown here, and those achieved by other processes using the arc, are relatively minor so that the observations and conclusions reached on the basis of these data apply with relatively small adjustments to other processes of the prior art.

Table 2 is a rearrangement of data on the utilization of hydrogen available from the decomposed feed stock. Thus column A of Table 2 shows the large excess of hydrogen over that which can theoretically be used up when all of the carbon available from the feed stock is actually converted to acetylene. Column B shows the still larger amounts of hydrogen which appear in the products of actual operation where carbon usage is not ideal.

From the known structure of hydrocarbons it is certain that all of the hydrogen in the molecules of same which appear in the final product must have had a transient existence in the arc or its vicinity as atomic hydrogen. Lack of opportunity to combine with anything other than another hydrogen atom forced the formation of hydrogen molecules to ensue. This is particularly clear in the case of methane. In the case of the other hydrocarbons being discussed, and all of the still larger hydrocarbon molecules which might be employed as feed stock, the opportunity for combination of atomic hydrogen with other molecular fragments is the greater the more complicated the original feed stock molecule. This probably accounts in part for the formation of olefins and lower paraffinic products in the case of treatment of the heavier molecules such as propane, butane and to a lesser extent ethane. But the appearance of hydrogen in the products is proof in itself that no such combination actually did occur with that particular fraction of the hydrogen atoms.

In the process being disclosed herewith a relatively large surface of a carbonaceous material is retained in the arc and attains high temperature, or alternately an inert solid also in the form of particles is retained in the arc. In the embodiment of the new process for acetylene manufacture using carbonaceous solid particles at least two distinctly different effects are achieved. The characteristic of the process is that the particles of solid move into and out of the arc repeatedly. Being of the order of some 400 to perhaps 2000 times as dense as the gas though of only slightly lesser specific heat each particle carries relatively tremendous amounts of heat out of the arc zone and into the immediate vicinity of the arc in comparison to the heat which would be carried by the volume of gas which it displaces. The heat effect is thus somewhat similar to that attending a decided broadening of the arc itself to include a greater volume than before. A major difficulty in the usage of an electric arc to react gases heretofore has been connected with inability to actually subject all of the gas to the action of the arc. A great deal of by-passing of the arc has been inevitable. By the use of the present invention this difficulty is markedly reduced which is one of its important advantages. The second effect achieved when I employ carbonaceous particles is that by reason of the contiguity of extended surfaces of reactive carbonaceous substance and the atomic hydrogen derived from the feed stock I form acetylene in amounts substantially exceeding those theoretically possible according to Equation 1 in which no carbon other than that from the feed stock gas is available.

Inasmuch as the solid particles are retained in the arc zone they act as carrier of heat and as reactable substance rather than as absorbers of heat except to the extent which it is necessary to heat the particle at the beginning of its sojourn in and about the arc. While the temperature which the particles attain is not well known nor is the specific heat very accurately known some appreciation of the order of heat required may be obtained. Thus to heat the 0.92+ lbs. of carbon necessary to make 1 lb. acetylene (with available atomic hydrogen) requires of the order of 0.35 kw.-hrs. if the temperature rise is 3000 F. A factor of from 2 to 4 must be applied to take account of the efficiency of particle retention in the arc zone but the resulting 0.70 to 1.40 kw.-hrs. compares very favorably with any of the figures of item 15, Table 1.

When I choose to use "inert" refractory particles in place of carbonaceous particles in treating gases by my process the chief effect obtained is that of increasing the active high temperature reaction zone due to heat transport by the particles. The effect is substantial. The data on higher hydrocarbon usage for acetylene production in Table 1, showing relatively large by-product yields, reflects to a considerable extent the effect of by-passing prior art arcs by the gases being treated. Much of the cracking obtained is the result of mixing very hot products from direct action of the arc with the much cooler portion of the stream which by-passed the arc but this type of relatively low temperature cracking results in very little if any acetylene production. Acetylene only results from breakdown to C, H and CH, and when the effective high temperature zone of the arc is increased by high temperature heat transport by solid particles this drastic breakdown of the original molecules is sensibly increased. The end result is the greater production of acetylene with the same input of electric energy.

While all of the preceding remarks have had to do with the use of paraffinic hydrocarbons it is well known that olefinic hydrocarbons may also be used to produce acetylene by conventional or prior process electric arc processes. Olefins or indeed naphthenes are must less advantageous charge stocks both from the process and generally from the economic standpoint. The present invention is likewise capable of forming acetylene from these inferior charge stocks and will show advantages over the use of prior art processes for the same purpose. All olefins and naphthenes show a ratio corresponding to those of column A, Table 2, for paraffines of 1.0. There is thus a substantial amount of excess hydrogen available for reaction with hot carbonaceous particles if I choose to use this embodiment of my process.

While I have introduced my new process means by referring to the production of acetylene from hydrocarbons, a manufacture to which it is particularly well adapted, it is obvious that the principle of increasing the reactive volume of an electric arc by retaining solids in the arc zone is also adapted to the treatment of other gases to make other products. Likewise the principle of employing carbonaceous solid particles in the arc zone, both for the purpose of increasing the reactive volume and for the purpose of effecting chemical reaction with the carbonaceous substance, is adapted to manufacture of still other products.

Accordingly, in the ensuing description of my process means I refer to gases as a generic term and to "solids" used in the gas generator or reaction zone, reserving more exact specification of both gases and solids to a later point where specific manufactures are discussed.

To describe my method more particularly, I refer hereinafter to the following figures:

Figure 1, flow diagram of the general process

Figure 2, plan view of my gas generator or reactor

Figure 2A:
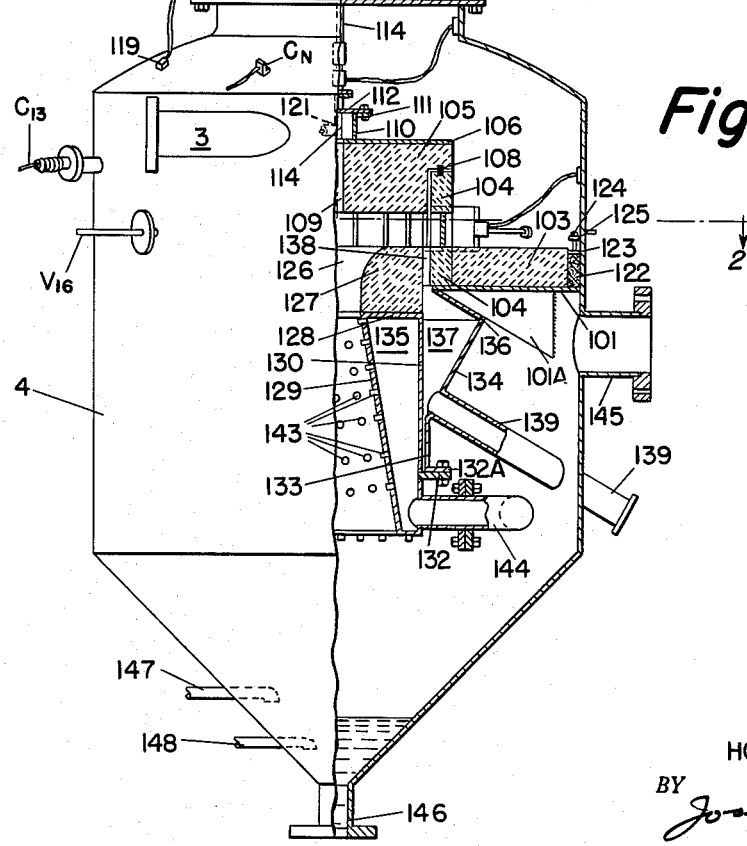

Figure 2A, elevation view of gas generator or reactor

Figure 2B, schematic plan diagram of generator chamber with 3 arcs

Figure 2BB, schematic elevation of generator chamber with 3 arcs

Figure 2C, schematic plan diagram of generator chamber with 4 arcs

Figure 3:
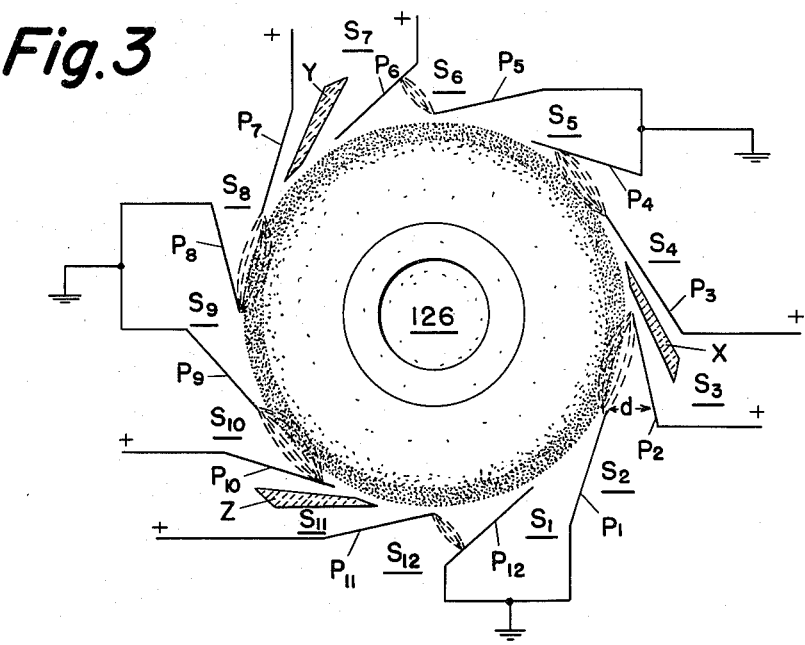
Figure 3A:
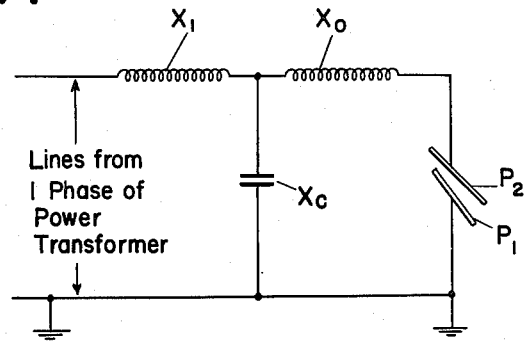

Figure 3, schematic plan diagram of generator chamber with 6 alternating current arcs Figure 3A, circuit diagram for alternating current arcs.

I refer now to Figure 1, which is a diagram of the flow of substances through a preferred embodiment of my process means.

Pipe 1 is the conduit for gas from a gas holder or other supply of the selected gaseous raw materials. Compressor 2 draws gas continuously from the source and compresses it to a pressure in the range of about 8 to a maximum preferably not more than 20 pounds per square inch gauge. Compressor 2 may be of any type adapted to continuous compression of gas to the specified end pressure. Pipe 3 conducts the compressed gas through stop valve 3A, which remains open during operation and is manually closed when the system is out of operation, and into the generator or reactor 4. The lead-in pipe is positioned tangentially on the cylindrical generator 4 by reason of which the gas takes up a rotary motion inside the generator. This rotary motion, augmented by other specified means to be described, positions a myriad of finely divided particles of solid in the arcs within generator 4.

To supply said solids, previously ground solid of selected size range is conveyed by suitable conventional means to hopper 5, surmounting vessels 7 and 9, which, together with accessories, comprise a pressure lock system adapted to introducing solids into a space under positive gas pressure without substantial loss of gas. A pipe connects hopper 5 with vessel 7, below it, said pipe being provided with valve 6. Another pipe connects the base of vessel 7 with the top of vessel 9, below it, said pipe being provided with valve 8. Pipe 11, connected into pipe 3, is also continually connected into the top of vessel 9, and may serve as a conduit for gas into the top of vessel 7, providing valve 11A is open, or by closing valve 11A, pipe 11 may be isolated from vessel 7. Finally, gas may be caused to flow from the top of vessel 7 to compressor inlet line 1, providing valve 16, in pipe 17, is open.

In normal operation vessel 9 is maintained partially filled with finely divided solid at all times and a substantially continuous stream of the solids is removed from the base of the vessel by means to be described. To replenish the contents of vessel 9 at intervals during the operation the procedure is as follows. Hopper 5 is filled with suitably conditioned and ground solid, the filling being carried out by conventional means such as a suitable conveyor (not shown) or by manual operations. Valve 6 is normally closed during the period when solid is charged to hopper 5. With valves 8, 11A, and 16 closed and the pressure inside of vessel 7 substantially atmospheric pressure valve 6 is opened and solid accordingly flows by gravity into vessel 7, partially filling same. Valve 6 is then closed and valve 11A is opened to raise the gas pressure in 7 to that existing in vessel 9. Valve 8 is then opened and solid flows by gravity into vessel 9 raising the level in same to a height well below the connection into pipe 11. In sequence following the charging of vessel 9, valves 8 and 11A are closed and valve 16 is opened, whereby the gas pressure in vessel 7 is brought down to the pressure in line 1 which is substantially atmospheric pressure. The system is thus brought to the condition where the operations described in previous portions of this paragraph can be repeated in order. By suitably frequent repetition of these steps vessel 9 is maintained partially full of solids at all times during operation of the arc generator 4.

Vessel 9 has a conical base which is connected into chamber 13 by a gas tight connection and during operation chamber 13 is held at superatmospheric pressure by flow of gas thru pipe 11 which communicates with chamber 13. Positioned preferably substantially horizontal in chamber 13 is a conveyor belt 12 adapted to be driven by a shaft passing into 13 thru a gas tight stuffing box, which shaft is turned at an adjustable speed by electric motor and gears 14 adapted to the purpose. The upper pass of conveyor belt 12 moves from right to left, as shown in Figure 1, and is positioned so that the face of the belt is somewhat below the orifice in the base of vessel 9. Accordingly when the belt is in motion solid flows on to the face of the belt by gravity and is conveyed by same to a position above and over hopper 15 into which it falls from the belt by gravity. The finely ground solid then flows by gravity through pipe 15A and valve 15B, which is open, and into generator 4.

It will be understood that whenever in the above description of the solid feeding mechanism I have indicated that solid flow is by gravity that I may, if desired, apply known means such as vibration of pipes or vessels to insure that the solids do not "bridge over" to prevent the desired gravity flow, or that I may apply other known means adapted to effect the same purpose.

It will be obvious that by initial adjustment of the distance between the face of the moving belt 12 and the orifice at the hopper base of vessel 9, and subsequent adjustment of speed of the moving belt 12, I may convey finely divided solid at a selected and substantially constant rate into generator 4.

I reserve description of the details of generator 4 to a later point herein, mentioning now only that nozzle 145, shown on generator 4, is the outlet for the mixture of product gas and water vapor from the generator. Typically the gas-vapor stream has a temperature of about 350° F. at this nozzle and contains a substantial amount of solid particles in suspension, chiefly primary and secondary carbon particles. It may also contain a certain proportion of fragments of the solid particles added to the generator thru pipe 15A. A substantial portion of the solid particles, added to generator 4 thru pipe 15A, leaves the generator chiefly by way of nozzle 146, at the base, being flushed into pipe 152 and carried down pipe 152 by water, as hereinafter more exactly described.

Focussing attention for the moment on the disposition of the gas-vapor-and-suspended-solids stream, it may be noted that pipe 153 conducts the mixture to centrifugal separator 154, which may be any one of several known types adapted to the removal of solids from gases by centrifugal force. Pipe 155, which may be open or closed by valve 156, serves as the port for the removal of the separated solids. In order to prevent the precipitation of liquid water, I preferably insulate separator 154 heavily, and I may, in addition, supply heat by known means whereby the walls of the separator are held above the condensation temperature for water vapor in the gas stream. I may employ any one of several known means to avoid the loss of gas when delivering solids through valve 156, including the use of a long column of solids, tending to act as a seal against gas flow, and including the use of equipment substantially similar to that shown for removal of the solids flowing in pipe 139A without loss of gas. To avoid unnecessary complication of Fig. 1, I omit indication of either of these means but refer to later description of vessels 140 and 141, with attendant piping, to illustrate one means of effecting my purpose of solids removal without gas loss.

Pipe 157 conducts the gas from the centrifugal separating device to one of two columns, 158 or 158A, which are used alternately to remove the last vestiges of suspended particles. The two columns are substantially identical and contain a depth not less than 15 feet of glass wool, or equivalent non-wettable fibers of inorganic substances. The wool is closely packed on suitable supports above the inlet nozzle to each vessel, the packing being indicated by 158P and 159AP, respectively. Both vessels 158 and 158A are insulated to reduce heat loss. When I employ vessel 158 for particle removal, the gas is directed thru valve 159, which is open, into the vessel 158, where it flows upward thru the layer of fiber or wool, 158P, to outlet pipe 160, containing outlet valve 161, which is open. The gas is delivered into pipe 162 and thence to cooler 163, described subsequently. By suitable choice of fiber and degree of its packing in 158, I find that the solid particles are entrained in the interstices of the packing and remain there as long as I maintain an upward gas velocity not in excess of 1.5 feet per second, and preferably less. When the lower part of the packed fiber bed 158P has been filled to a point where substantial amounts of solids begin to appear in suspension in the gas entering pipe 160, I switch the gas flow into vessel 158A by opening valve 159A to direct gas thru pipe 164 and into vessel 158A. I also open valve 161A, in line 160A, which is connected to line 162, in order to pass gas to cooler 163. I then close valves 159 and 161 in the pipes connected to vessel 158, and proceed to clean the fiber layer in vessel 158, as follows. I open valve 165 in a branch of pipe 166, which conducts water from the plant supply pipes into vessel 158, thru a multiplicity of spray-forming nozzles, indicated as 167 in Figure 1. These spray-forming nozzles are adapted to distribute the spray substantially over the entire top surface of the fiber bed.

I find that the cleansing action of the water may be substantially improved by the addition of minute quantities of wetting agents. A water solution of a suitable wetting agent may, accordingly, be made up batchwise and maintained in tank 168. When I choose to add a wetting agent, I operate pump 169 and manipulate valve 170 to deliver the solution at a regulated rate thru pipe 171 and into water supply pipe 166.

The water, or solution, sprayed from the multiplicity of nozzles, 167, in vessel 158, trickles downward thru the fiber bed, 158P, displacing the carbon particles which cling to the fibers in the lower parts of said bed and flushing same into the conical base of vessel 158, from which the flow is thru valve 180 and thru a relatively large diameter pipe into vessel 175, which is provided with a launder, 176. The solids are typically not well wet with water, even in the presence of a wetting agent, and it is imperative that a large diameter pipe, 181, be used to convey the solids floated on, or more or less mechanically forced downward, by water flow. As a substitute for pipe 181, I may employ a conveyor for solids, with or without concomitant water, into vessel 175. When I employ vessel 158A for gas cleaning and subsequently wash the same to fit it for reuse, obvious procedures entirely similar to those already described for vessel 158 are carried out. Corresponding elements, pipes, reactors, etc., for vessel 158A have numbers identical with those given in connection with vessel 158, except for the addition of the letter A.

Vessel 175, preferably also serves as a receiver for solids sluiced thru pipe 152, as previously described. In order to separate the solids in 175 from the water, I preferably provide a continuous filter, 183, which is supplied with water and solids from the conical base of vessel 175, thru line 182, the flow being suitably adjusted by valve 184. A vacuum pump, 185, maintains a suitable sub-atmospheric pressure in receiving tank 186, which is in communication with filter 183, receiving both gas and filtrate thru line 186A. Continuous operation is maintained by removing the liquid from separating tank 186 by pump 188, which operates substantially continuously to deliver the liquid flows thru liquid level controlled valve 187 to suitable disposal. The filter cake, formed by continuous operation of filter 183, is delivered into a storage bin or tank 189, from which it may be removed from time to time thru valve 190 at the base.

Removal and disposition may be by other known means adapted to handling a moist solid cake.

From time to time I open valve 191, in pipe 192, which leads finely divided carbon particles which float, together with water, from the launder 176, into the reservoir for filter 183. The finely divided carbon particles may thus be filtered to a relatively low water content and may be introduced into tank 189, together with the solids previously mentioned. Alternately, if I choose, I may provide a second aggregate consisting of filter, filtrate receiver and vacuum pump, and liquid disposal pumps, in order to separately treat the solids which overflow the launder from those in the underflow from tank 175.

One mode of disposition of the hot gas flowing substantially continuously thru line 162 will now be described. While I may use other means to remove the heat in the gas, I may prefer to do so by means of water sprays in tower 163. Said tower is adapted to contact upflowing gas with large volumes of water in spray form, supplied by pump 192 from cooling tower 193. Valves 194, 195, 196 and 197 are supplied to adjust the proportions of water flow from supply pipe 198, so that the gas emerging from pipe 199, at the top of cooling tower 163, is preferably not in excess of 90° F. temperature.

Water, preferably in the temperature range of 120° to 140° F., collects in the base of cooling tower 163, where it forms a pool, maintained by liquid level controller 200, adapted to operate valve 201 in discharge pipe 202, from pump 203, which communicates with the base of the cooling tower via pipe 204. While I may dispose of this warm water to sewers or other appropriate disposal means, I preferably recirculate it after passing thru an evaporative type of cooling tower, such as 193. This cooling tower is preferably of the forced draft type, ambient air being forced upward, against the downfalling droplets and rivulets of water, by fan, 207, driven by motor, 205. The cooled water collects in the base and is returned to pump 192 via pipe 206.

The cooled gas stream flowing thru pipe 199 is the end product gas mixture of my new process. It is substantially free of solid particles. Typically, when I make acetylene from hydrocarbon gas and solids by my process the gas is chiefly composed of hydrogen, unreacted feed gas components, and acetylene. These principal components are in variable proportions depending upon the amount of electric power which I apply per unit of feed gas input and other operative factors in my process. Among the other products in the gas mixture emerging from pipe 199 are olefins, typically in less concentration than acetylene, unless the original gas charged to the process contains very substantial amounts of olefins. In addition to these constituents, the gas typically contains a fraction of any nitrogen which may have been introduced with the feed stock in the form of free nitrogen, and the remainder of free, and most of the fixed nitrogen, appears typically in the product stream in the form of hydrocyanic acid. The sulphur which may have been introduced with the gaseous or solid feed to the generator is typically carried by the product gas as hydrogen sulphide. In addition, side reaction products such as methyl acetylene, vinyl acetylene and diacetylene are typical components of my product gas. The product of the solubility of these various components, and their concentration in the gas carried by pipe 162, is such that the warm water leaving the base of cooler 163 typically contains only a negligible fraction of each of the aforementioned components in solution. Accordingly, they emerge as final products of my process thru pipe 199.

Means for separating the components of the gas mixture leaving my process thru pipe 199 are not a part of the present invention. But it will be understood by those acquainted with the art that conventional procedures, adapted to separating acetylene and hydrocyanic acid and other components in required percentage purity, may be applied to the product gas mixture leaving my process via pipe 199. I preferably remove the hydrogen sulphide by known processes adapted thereto at an early stage in the series of processing steps. As a final stage, after substantially all of the other components are removed, I may apply the well-known process of hypersorption to the residue gas in order to obtain the hydrogen in the mixture, in a relatively pure form as one stream, and a hydrocarbon stream which comprises unreacted raw materials, together with olefinic products of the action of my generator. I may, if I choose, return all or any fraction of this mixture of hydrocarbons to the action of my conversion means, preferably after thoroughly mixing same with fresh feed gas prior to introducing it into my generating means. In addition, I may return a chosen fraction of the total hydrogen stream to the action of my process, preferably by admixing the hydrogen with fresh charge gas.

When I make products other than acetylene, pipe 199 likewise carries the gas mixture containing the product or products of chief interest. In the event, however, that I have applied my method to the manufacture of gas mixtures with substantial amounts of substances which are largely soluble in water, such as hydrocyanic acid, I usually prefer to employ tubular coolers for the gas mixture providing heat, but not material exchange with cooling water as a substitute for the spray water cooler 163. By employing this alternate only the water condensed with the gas has opportunity to dissolve the soluble gas. I then preferably separate the condensate and gas phase by conventional methods and separately treat the two phases by methods appropriate to recovery and concentration of the components to desired purities.

In order now to describe my gas generator in detail, I refer to Figs. 2 and 2A which are respectively the plan and elevation of one preferred embodiment of my generator or reactor (item 4 of Fig. 1) for converting gaseous raw materials to desired products by subjecting them to the action of an electric arc and the presence of hot solid particles. The elevation, Fig. 2A, shows the vertical cylindrical shell with conical base which constitutes generator 4. The view of the interior of the generator is taken substantially from broken plane 2A—2A, shown in Fig. 2. Fig. 2 is the view at the broken plane, indicated by 2A—2A in Figure 2A. Tangential gas inlet pipe 3 for generator 4 is seen to the left in Figures 2 and 2A.

In the particular embodiment of my invention shown by these figures, the reactor itself occupies the upper portion of the vessel and the lower portion constitutes a volume for quenching the hot product gas which enters it by means of water sprays. An annular shelf, 101, is positioned and firmly supported by metal brackets, 101A, suitably welded to the inside of the shell. Refractory blocks, 103, are cemented together to form an annular ring of refractory solid, which is supported on shelf 101. A special cylindrical collar, 104, is positioned concentric with the axis of generator 4 and is arranged so that the lower solid cylindrical portion of the collar fits inside of the ring formed by refractory blocks 103, the joint being made gas-tight with suitable refractory cement. Cylindrical collar 104 is made of special refractory which will withstand elevated temperature and maintain its high electrical resistance at elevated temperature. A closure is provided for the upper portion of the collar, said closure being formed of refractory cement firmly attached to a circular metal backing plate 106 by suitable metal wire reinforcing mesh welded to the plate 106, and forming a support for the refractory by reason of its disposition within the interior of the finished closure. The joint between the circular closure 105 and the collar 104 is made gas-tight by a suitable packing ring 108, positioned by a circumferential groove in 104 and a circumferential groove in closure piece 105, which registers therewith. The packing is preferentially made of asbestos fibers. Normally the weight of the closure piece resting on the packing 108 is sufficient to form a gas-tight joint, but if necessary, I provide hold-down clips and bolts to bind 105 rigidly to collar 104. When used, these clips and bolts take an obvious form but same are not shown in Figure 2A. A radial slot 109 is provided in the refractory closure 105, which slot pierces backing plate 106. An elongated gas-tight metal chamber 110 is welded to backing plate 106, which chamber is provided with a flange 111, gasket and cover plate 112, with bolting arrangements adapted to make a gas-tight cover for chamber 110. An axial shaft or rod 114 passes thru a stuffing box welded to plate 112 and rendered gas-tight by packing in known fashion. Said shaft 114 extends upward thru stuffing box 115 in cover plate, or head 116, for the generator. Packing in stuffing box 115 prevents gas from emerging from the interior of generator 4 to the outside. The upward projection of shaft 114 is provided with a hand wheel 117 adapted to manual rotation of the shaft about its axis. A copper or other suitable metallic conducting lug 119 is electrically bonded to the shell of the generator, and an electrical conductor 120 adapted to carrying high amperage current is attached thereto and connected to cylindrical lug 118 which is in turn electrically bonded to shaft 114. Conductor 120 is flexible and of such length as to facilitate the rotation of shaft 114 substantially more than 360° about its axis.

The lower end of the shaft 114 is provided with an extension at right angles to the axis of the shaft. This extension or radial arm 121 is most clearly seen in the plan view, where it is shown in its normal position at a slight angle with slot 109, and thereby resting on portion of closure 105, which is inside chamber 110. The radial arm 121 is made integral with, or at least is, electrically bonded to shaft 114 and except for the outermost tip, is provided with a high temperature resisting, electrically insulating sheath 121a. The lower end of shaft 114 is likewise preferably provided with a sheath of similar characteristics, same being joined to the sheath on the radial arm. Whenever desired, a slight angular rotation of shaft 114 by manual manipulation of handwheel 117 will suffice to position arm 121 directly above slot 109. Shaft 114 may then be pushed downward, carrying arm 121 thru the slot 109 until the motion is arrested by lug 118, bearing against the upper plate of stuffing box 115. The relative positions of lug 118 and arm 121 are arranged so that the plane of the latter is below the plane marked by the lower end of closure 105, when lug 118 bears against the upper plate of the stuffing box 115. The interior radius of cylindrical collar 104 is somewhat greater than the length of radial arm 121, so that free rotation of shaft 114 is possible over an angle of more than 360 degrees, corresponding to the length of flexible electrical conductor 120. When this rotation is effected manually by means of handwheel 117, the outer end of radial arm 121 is carried in a circular sweeping motion close to the inner circumference of collar 104 and in a substantially horizontal plane. By reversing the motion of rotation, when same is limited by the length of conductor 120, radial arm 121 may be carried in a reverse direction so that its end describes a circular path of somewhat more than two revolutions. The forward and reverse sweeping motion may be carried out as often as desired, after which, by obvious reversal of the motions already described, the radial arm may be returned to the chamber 110, stop closure 105, and maintained at rest there by disposing it at a slight angle to slot 109.

It has already been mentioned that refractory blocks 103 are joined together with refractory cement so that in effect a refractory disk is provided, into the central circular aperture of which, collar 104 fits and makes, by the aid of refractory cement, a gas tight joint therewith. The outer circumference of the disk is made gas tight with the enclosing shell by insertion of packing 122 which may advantageously be blue asbestos fiber compositions adapted to withstand elevated temperatures without decomposition. A multiplicity of metal strips bent to conform approximately with the curvature of the shell combine to form a substantially continuous retaining ring for the packing material. Said strips 123 are forced down upon the packing by adjustment of bolts 124 provided with threads which engage with threads in lugs 125 which are welded to the shell of cylinder 4. The entire arrangement of packing and retaining ring is adapted to provide for expansion and contraction of disk 103 with temperature changes while the joint between disk and shell 4 is maintained substantially gas tight.

All of the aforesaid provisions for substantially gas tight joints at specified positions are adapted to force all of the gas which enters generator 4 thru pipe 3 to pass thru special slots in the central portion of collar 104. The form of these slots $S_3$ and $S_6$ is best seen in the plan view. Vertical plates $S_2'$ and $S_3'$ form the side walls of slot $S_3$, said plates being made of refractory and made integral with the imperforate upper and lower sections of collar 104. The aperture is thus substantially rectangular in cross section. The side walls $S_2'$ and $S_3'$ are positioned as indicated and are set at an angle of about 12 degrees with the tangent to the circle which is the locus of the inner edges of the side walls on a plane perpendicular to the central axis of generator 4. Slots $S_6$ and $S_9$ are geometrically similar to slot $S_3$ as are an appropriate number of other slots disposed around the entire periphery of collar 104.

The common side walls of slots $S_4$ and $S_5$ and of slots $S_7$ and $S_8$ respectively are made of electrically conducting plates preferably of a suitable metal or alternately of electrode carbon. These plates are movable parallel to their central vertical plane their motion being guided and restrained by grooves in the upper and lower imperforate portions of collars 104 and registering grooves in refractory disk 103. These two plates are the conducting electrodes between which, in normal operation, an electric arc of high intensity is maintained, the arc being formed in the interior of collar 104 in the space between the inner edges of electrode $P_4$ and $P_7$. In normal operation the electrodes are each positioned so that slots $S_4$ and $S_5$ and slots $S_7$ and $S_8$ have a form, angularity and cross section, as nearly as conveniently may be, to these characteristics for the substantially invariable slots $S_3$ and $S_9$. As required to satisfy this preferred positioning, or for other reasons each electrode may be independently retracted or advanced toward the interior of the chamber formed by collar 104. In the case of electrode plate $P_4$ a rod $V_4$ passes thru a stuffing box $t_4$ in the shell wall and the inner end is provided with a mechanical connecting lug $q_4$. A diametrically positioned pin in $q_4$ passes thru an oversized hole in a lug affixed to $P_4$ which lug fits loosely inside lug $q_4$ thus forming a positive but not entirely rigid connection between rod $V_4$ and electrode $P_4$. The arrangement is adapted to advance and retraction of electrode $P_4$ by an amount which may be regulated in accordance with suitable graduations provided for the length of $V_4$ which extends outside of stuffing box $t_4$. A suitable flexible electrically conducting wire $e_4$ is electrically bonded to electrode $P_4$ and to a lug on the interior of the shell 4, the length and positioning of the conductor being such that no restriction to the motion of $P_4$ in its guiding grooves is encountered. A functionally similar arrangement is provided to advance and retract electrode $P_7$ at will, the essential difference being that an insulating member $i_7$ is provided whereby mechanical connection between the rod which passes outside the shell can be maintained without any electrical conducting path being established. In addition the flexible conductor $e_7$ bonds electrode $P_7$ to rigid conductor $c_7$ which is provided with a nonconducting sheath $d_7$ which forms a gas tight mechanical connection with stuffing box or gland $t_7$ while at the same time preventing the flow of electricity between the generator shell 4 and itself.

In the particular embodiment of my invention, as illustrated by Figure 2, I provide three pairs of electrodes between which in operation three electrical arcs are established and maintained. One arc plays between the inner end of electrode P-4 and the inner end of electrode P-7. The other two arcs are spaced equally around the inner circumference of collar 104 and are identical in arrangement with the arc which plays between electrodes P-4 and P-7. In this particular embodiment of my invention, I have shown 18 slots, S-1 to S-18, provided for gas-flow through collar 104, and it may be noted that the arc between electrode P-4 and electrode P-7 may be said to bridge slots S-5, S-6 and S-7. The other two arcs are established between electrodes P-10 and P-13 and electrodes P-16 and P-1, only the last-named of which is fully diagrammed in Figure 2. Electrode adjusting rods, V-10, V-13 and V-16, are shown, however, together with their respective stuffing boxes, which render them gas-tight. From the foregoing description, it will be clear that the first arc, measured counterclockwise from that between P-4 and P-7 bridges the slots S-10, S-11 and S-12, while the second arc, between P-16 (not shown) and P-1, bridges the slots S-16, S-17 and S-18. See also Figure 2B.

Electrodes P-10 and P-16 are geometrically and electrically similar to electrode P-4 and, hence, like P-4 are electrically bonded to the shell of generator 4 by conductors similar to $e_4$. Electrodes P-1, P-7 and P-13 are geometrically and electrically similar and, hence, are insulated from the shell, the conductor terminals of same being respectively C-1, C-7 and C-13. To conduct the electrical current for the arc, one pole of each of three electrically independent sources of direct current at suitably high potential to bridge the arc gap is connected respectively to conductors C-1, C-7 and C-13. Each of the other three poles of the electric power source is grounded and connected by a suitable conductor to a convenient lug $C_n$, which is electrically bonded to the shell of generator 4. A positive earthed connection is thus established electrically with the three electrodes P-4, P-10 and P-16.

While the electrical circuits adapted to supply power continuously to extended high intensity electric arcs are well-known and are no part of my present invention, I have, in the interests of clarity, shown in Figure 1 three rotary converters, $RC_1$, $RC_2$, and $RC_3$, each supplying one arc by means of conductors carried respectively to arc terminals C-1, C-7, C-13 and to the grounded connection $C_n$. Switches $SW_1$, $SW_2$, and $SW_3$ adapted to disconnecting the source of direct current power from the generator terminals are shown.

It will be understood by those acquainted with the art that more elaborate circuits are preferred to maintain stable arcs of high intensity and over a substantial arc gap. Means to increase the applied voltage of the direct current when the arc resistance momentarily increases and the means to reduce the potential when the resistance decreases and thus hold the power input approximately constant are advantageous and substantially necessary. The nature of these requirements is well understood by those acquainted with the electrical engineering field and will not be discussed here. It may, however, be stated that in many, if not most, cases in which my invention is applied, it may be preferable to use mercury arcs or equivalent rectifiers in place of rotary converters to convert alternating current to direct current. Here again specialized circuits are required with ballast arrangements to stabilize the arcs, and here again the requirements are well understood in the electrical engineering field providing the exact dimensions of the arc and the constant power input desired are specified. I normally provide energy in the total number of arcs applied to treatment of hydrocarbon-containing gas in a single pass, which is preferably adjustable in the range from about two kilowatt hours per pound of fresh feed to as low as two-tenths kilowatt hours per pound of fresh feed gas. The optimum amount of power to be applied in the arcs varies with the composition of the gas and must be experimentally determined. In general, however, larger amounts of energy per pound of feed gas is required for gases having B. t. u. values in the lower range of the preferred feed stocks for my process and less energy per pound of gas is required for high B. t. u. gases.

Having now described the means whereby I establish and maintain three arcs inside the collar 104, I return to a description of other elements characteristic of my gas generation means in the particular embodiment illustrated by Figure 2. I provide at least one pipe, 15-C, which is preferably welded and thus made gas-tight at its junction with the shell of generator 4. The inner end of this pipe terminates near the entering orifice of slot S-3 at an elevation such that flowing gas passes around the entire periphery of the pipe. Pipe 15-C is positioned to slope downward and facilitate the gravity flow of finely divided solid to the inner end of said pipe. The outer extremity of pipe 15-C is connected gas-tight to pipe 15-A and thus communicates, as described in connection with Figure 1, with a continuous source of finely powdered solid.

In operation, gas which jets inwardly through slots S-1 to S-18 in collar 104, takes up a whirling motion inside same and is gradually directed to central orifice 126 in the cylindrical plug 127, which is made of suitable high temperature resisting refractory, supported on a circular metal base-plate, 128. Pipe 129, preferably shaped in the form of the frustum of a cone, is welded gas- and liquid-tight to base-plate 128, as shown, and forms one wall of the water jacket 135, formed between pipe 129, base-plate 128 and cylindrical pipe 130, which is provided with a flange 132. This flange is provided with a gasket and is bolted gas-tight to companion flange 132A, carried by cylindrical jacketing pipe 133, which in turn is the lower end of a compartment formed by two frustums of cones, 134 and 136. Plates 136, 134 and 133, together, form an annular chamber which is open at the top by reason of annular orifice 138 between refractory plug 127 and collar 104. Chamber 137 is adapted to receiving and temporarily retaining solid particles which may enter through annular orifice 138. Means for removing solids which may find their way into chamber 137 is provided by pipe 139, which is made gas-tight, to chamber 137, and likewise gas-tight to the shell of generator 4. Pipe 139 is positioned at an angle to the horizontal greater than sliding angle of the solid which may find its way into chamber 137, and at a sufficient distance below annular orifice 138 that solid which falls through same at a position diametrically opposite to pipe 139 will fall by gravity into pipe 139.

It is convenient to describe here the disposition of solid which may pass downward thru pipe 139, for which purpose I refer to Fig. 1. Pipe 139 is connected to pipe 139A, either branch of which may be placed in communication with vessels 140 and 141A, by opening and closing valves 140A and 141A. Vessels 140 and 141 are each provided with gas pipes having valves 140B and 141B, which may be opened or closed as desired. Each of said gas pipes is connected into pipe 142, which is also connected into inlet gas pipe 1. Vessels 140 and 141 are each provided with cone bottoms and closure valves 140C and 141C in appropriate bottom outlet pipes.

When I operate my process I use vessels 140 and 141 alternately as receptacles for solids which fall into jacket 137 (Fig. 2A). If I choose to use vessel 140 as receptacle for solids, I first close all valves except 140B, whereby I reduce the gas pressure in vessel 140 to that of pipe 1, which is substantially atmospheric pressure. I then close valve 140B and open valve 140A, whereby solids gravitate through line 139 (Fig. 2A) and 139A (Fig. 1) into vessel 140 until same is suitably filled with solids. I then first open valve 141B to establish gas pressure substantially identical with pipe 1 in vessel 141, I then close 141B, open valve 141A and close valve 140A. I thus establish the flow of dry solids by gravity into vessel 141. By opening valve 140B, I reestablish substantially atmospheric pressure in vessel 140, after which I close valve 140B and open valve 140C, whereby I cause the solids contained in vessel 140 to flow into any chosen convenient means for disposition, such as a truck. When vessel 141 is sufficiently filled with solids, I repeat procedures similar to that described for vessel 140 in order to empty same after vessel 140 has been arranged to receive solids, including, of course, the closure of valve 140C.

Returning now to Fig. 2A and to description of generator 4, it may be noted that the wall of water jacket 135 and the annular base thereof is provided with a multiplicity of nozzles adapted to provide water spray throughout the interior of the conical gas pipe 129. The number and arrangement of the nozzles, which are provided, is adapted to cooling of the gas flowing downward thru the pipe at the highest possible rate by evaporation of the water from the sprays. Water jacket 135 is provided with water from a source of supply by means of pipe 144, connected into the jacket, said water being under pressure to sufficiently provide the nozzles with the requisite energy for producing a fine subdivision of the water as aforesaid. Water inlet pipe 144 and the multiplicity of spray nozzles 143 are adapted to injecting into the gas flowing in 129, at least that number of gallons of water per hour, which is indicated by the product of the two factors, namely, 0.3 (kilowatts, electric power expended in all arcs).

In the operation of my process, the water flowing thru the nozzles fitted to chamber 135 is regulated by a suitable valve, 144A (Fig. 1), in the water supply line connected to water inlet pipe 144, I normally regulate the water flow to reduce the gas temperature, preferably to not more than 350° F. as it flows thru outlet nozzle 145 (Fig. 2). Some of the solid particles which may be carried by the gas entering pipe 126, typically deposit in the conical base of generator 4. The remainder of the solids pass with the gas out of generator 4, through nozzle 145. The treatment which I accord this gas stream with entrained solids has been described already.

Positioned in the cone base of generator 4, somewhat above nozzle 146, are two pipes, respectively pipe 147 and pipe 148, one above the other. The two pipes are connected into a liquid level measuring and controlling device, 153, as shown in Figure 1. Nozzle 146 is connected into pipe 152 and water supply pipe 149 is introduced concentrically into pipe 152 to provide a jet action when water under pressure flows from pipe 149 into pipe 152. Liquid level control device 153 is of a known type, adapted to close valve 150 in pipe 149, when the water level in the conical base of the generator rises to the predetermined height of pipe 147, and 153 is also adapted to close valve 151 in pipe 152 when the water level in the conical base of generator 4 falls below that of pipe 148. It has already been mentioned that pulverulent solids may settle from the gas stream flowing downward through pipe 129. These solids, together with any unevaporated water from the sprays, flow into the conical base of generator 4. When water flows through pipe 149 the solids are sluiced into and through pipe 152 to a point of disposition, to be described later.

A water level is continuously maintained in generator 4 by automatic regulation of valve 151, as described. Though the ambient temperature of the gas above the water surface may be above boiling water temperature, the relatively small extent of the surface limits the heat transfer, and a pool of liquid, serving to quench the hot solids, can be maintained. When and if the water flowing into pipe 152 is sufficient to raise the water level to the height of pipe 147 in the cone base, the liquid level regulator 153 operates to close valve 150 and stops water flow into the cone. The liquid level then drops below pipe 148, at which time the flow of water is re-established through pipe 149 by regulator 153. By the means described, pulverulent solids, which may drop out of suspension in the gas and fall into the cone base of generator 4, are cooled and sluiced away from the generator without loss of gas from the base of the generator.

Having described one form of generator or reactor, item 4 of Fig. 1, and its internal arrangements, its action during operation to convert gases will now be described. The continuous stream of gas entering generator 4 thru tangential pipe 3 when compressor 2 is in normal operation circulates relatively slowly about collar 104. On entering the slots in collar 104, it acquires a velocity preferably not less than 100 feet per second, said velocity being predetermined by choice of the number and size of slots in respect to amount of gas to be treated per second. The gas is set into vortex motion inside collar 104 and the motion is maintained by the jet action of the multiplicity of gas streams corresponding to the number of slots. Solid particles are continuously introduced thru pipe 15C and are caught up by the gas and injected into the chamber where centrifugal forces tend to throw the solid particles to the inner circumference of collar 104. However, the particles are prevented from moving to extreme perimeter of the vortex by the flow of gas thru the slots. The particles thus circulate at high velocities in close proximity but generally not in contact with the ends of the slot vanes of collar 104. A sufficient amount of comminuted solid is introduced per unit of time to maintain a relatively high solids concentration and substantial radial thickness to the cloud of particles which rotates in suspension in the gas vortex.

Figure 2B is a diagrammatic plan, and Fig. 2BB is a side-view of the arc chamber in operation. The arcs are shown playing between electrode pairs, P4 and P7, P10 and P13, and P16 and P1. To avoid confusion the electrodes are indicated by single lines in Fig. 2B and are not shown at all in the elevation Fig. 2BB. In Fig. 2B the cloud of solid particles is seen as an annulus. In Fig. 2BB only those particles in the near vicinity of the cross sectional plane are shown since, to include particles in the background would tend to confuse. It will be understood, however, that the particles circulate in a volume which has substantially the form of a hollow cylinder without end pieces.

In Figure 2B a series of arrows, labelled Y, indicate the imaginary path of an elementary volume of gas from slot $S_5$ thru the arc between P4 and P7, partly thru arc P10 and P13, and into the central outlet pipe 126. Similarly a series of arrows, labeled Z, trace the imaginary path of an elementary volume of gas from slot $S_5$ to the outlet pipe 126. While, for the sake of simplicity the path of both of these elementary (imaginary) gas volumes is shown to make only about one revolution of a spiral, it will be understood that more than one revolution of an elementary gas volume is typical at the preferred high velocities which I employ in my arc chamber. Much mixing, of course, also takes place.

The major portion of properly sized particles of solids continue to rotate around the vertical axis of the arc chamber for an indefinite period or until their size is reduced by vaporization or direct chemical action and gasifying action at the solid surfaces. Particles reduced to a smaller and smaller diameter by either effect are ultimately caught up by the gas and forced down pipe 126. The largest particles tend to be thrown to the outside radius of the circulating cloud and may ultimately be lost vertically downward thru the circumferential orifice, 138. While the centrifugal force which is generated by my apparatus in normal operation is typically several score times that of gravity, the particles tend to settle somewhat in their circulation about the central axis. To prevent an undue proportion of particles gradually finding their way into annular orifice 138, I preferably provide small lips on at least two substantially diametrically opposed slots capable of deflecting the gas which passes along the base of these slots slightly upwards, as it enters the chamber. This upward deflection of a portion of the gas tends to restore the solid particles to higher levels of rotation against the action of gravity, and prevents the loss of a substantial portion of the cloud of solid particles through orifice 138. For example, I may provide slots $S_3$ and $S_{12}$ with the aforesaid lips or upwardly inclined surfaces, the curvature of which is relatively slight and scarcely discernible except on a large scale drawing.

While I may obviously employ more than one pipe, 15C, for introducing powdered solids to the arc chamber, in typical cases I find one pipe sufficient. The particles caught up by the high velocity gas stream at the entrance to the selected slot (such as $S_3$ of Fig. 2, or 2B) are quickly injected into the interior of the chamber formed by collar 104. The particles take up positions in the rotating cloudband in, more or less, even distribution substantially instantaneously after their introduction.

The particles also take up, substantially immediately after their introduction, a very high temperature corresponding to passage through numerous arcs in every second of their travel about the vertical axis of the chamber. If, for example, in the embodiment of my invention corresponding to Figure 2B, the cloudband of particles is rotating at the rate of 14 revolutions per second, which is a substantially lower velocity than I preferably maintain, it is obvious that in the first second after its introduction, any typical particle in the arc chamber of Figure 2 will have passed thru, or very near to, 42 arcs. In the particular embodiment of my invention represented by Figure 2B, the particles are in the immediate vicinity or within locus of an arc for approximately one-half of the elapsed time. The other half of the time each particle is subjected to some cooling by the stream of gas injected thru slots not bridged by an arc. The heat loss by a particle is substantial. Nevertheless, since the solid particle is moving forward in its rotation with the gas and at a speed not far different from that of the cooler gas mixture near a slot, the relative velocity of gas to particle is only a small fraction of the slot velocity of the gas. As a consequence, the heat transfer is substantially less than would otherwise occur. It will be shown later that in other arrangements, which I may employ for my arc chamber, I can avoid the direct impingement of inlet gas on the heated solid particles rotating in the cloudbank, outside the locus of an arc, but it is obvious that even with a construction such as is illustrated in Figure 2B, the average temperature of the particles will be maintained at a high, though variable, temperature throughout the period spent in revolution of the reaction chamber.

The highly heated particles rotating in the "cloud band" of my apparatus occasion direct thermal cracking of the ambient gases in contact with their surfaces entirely apart from whether the particles are or are not, at the moment of consideration, located within the locus of an arc. I thus obtain in my conversion means the increase of effective or active reaction volume over and above that previously obtained from electric arcs employed to react gases, which has already been mentioned. I may distinguish between direct cracking of hydrocarbons to acetylene by heating in the arc by the term "arc cracking" and reserve the term "thermal cracking" to gas decomposition by extended hot surfaces. In the sense of these definitions, my present invention provides for both arc and thermal cracking. No practical mode of achieving both these two effects has heretofore been described to my knowledge.

An extremely important feature of my process is that the solid particles are retained in the arc zone for a relatively long sojourn in comparison to the average time of the gas phase in the arc zone. In order to get the effects which I desire between the solids and the gas, it is essential that a substantial concentration of solids be present in the gas in and about the locus of the arc so that relatively large surfaces of solid substance is presented to the action of the gas while the surfaces are at high temperature. Yet at the same time it is essential that the time of exposure of any elementary volume of gas to the arc be not longer than very small fractions of a second. Relatively high solids concentration in the gas phase in the arc and minute time of passage of the gas thru the arc demands the retention of solids provided by my process since, without solids retention, the cost of heating a tremendous weight of solid per unit of gas flow would far exceed the value of the products made, even though ideal yields were achieved.

When I employ non-reactive solids in my process and apparatus, I may employ a range of sizes and corresponding velocities of the gas stream such that the particles remain substantially indefinitely, or at least for very long periods, in the arc zone. Replacements in this event are necessary mainly to the extent that particles in circulation are fragmented by attrition, or by temperature changes, or by the effects of momentary fluctuations in gas velocity. I usually prefer, however, to use size ranges such that particles continually leave the arc zone with the gas and are simultaneously replaced by new particles which I introduce into the generator. In this way, smaller particles may be used and the gains attributable to greater heat transfer and surface effects offset the disadvantages of greater particle replacement.

When I employ reactive carbonaceous particles in my process, I obtain the thermal cracking effects already mentioned, together with the chemical action at the surfaces, forming gaseous products. The chemical reactions, together with the vaporization in the intense heat of the arc progressively reduce the size of any given particle. Ultimately each particle reaches that small size where centrifugal force, reflecting its mass, cannot continue to hold it in the arc zone against the impelling forces of gas friction. The particle then moves out of the arc zone with the gas to, and thru, the central outlet. However, by a suitable choice of particle size range and gas velocity, I can cause reactive particles to remain in the arc zone over periods corresponding to many hundred revolutions or at least until a marked decrease in size results from a substantial degree of reaction.

It will be understood that the primary carbon particles which are formed in the arc and the secondary carbon particles formed by decomposition after gas leaves the arc are of quite a different and lower order of size and weight than are the mechanically added solid particles, whether the latter be reactive or nonreactive solids. Accordingly, these primary and secondary carbon particles are almost instantaneously whipped out of the arc zone by the gas. The action constitutes a species of automatic selection of particles which are retained in the arc zone, which selection is advantageous to my process.

Having now described my process in one preferred embodiment, it will be understood that I am not restricted to the use of this particular embodiment but may employ any one of numerous possible alternative treating methods, and any one of numerous arrangements of the elements of generator 4.

For example, but not restrictive thereto, I may substitute other types of centrifugal separators for separator 154 of Fig. 1, or I may employ known devices depndent on impact or on electrical charges for separating solids from gas phases.

I may also substitute one of several well known types of "stocking filters" for the beds of fibers in columns 158 and 158A of Fig. 1. If I use one of these alternates to remove solid particles from the gaseous products, I preferably provide heating jackets or other heating means for the housing for the stocking filters, whereby I maintain said housing at temperatures substantially above that where water vapor can condense from the gas phase. The cloth employed for the stocking filters may advantageously be made of glass fibers or other material not substantially affected by the temperature of the gas. I preferably employ a stocking filter ensemble adapted to continuous cleaning of the filter surface by means well known in the art.

As another alternative, hereinbefore mentioned, I may find it advantageous to limit the contact of the gas, flowing in pipe 162 of Fig. 1, or its functional equivalent, with liquid water and in these cases I may substitute tubular water coolers in place of contact water cooler 163 of Fig. 1.

In the embodiment of my invention, diagrammed in Fig. 1, which is adapted to treating gaseous charge stocks, I pass the selected gas directly from compressor 2 to generator 4 at the temperature above the ambient air substantially corresponding to the end temperature of compression. If I choose, I may insert a tubular preheater between the point of entry of pipe 11 into pipe 3, and the point of entry of pipe 3 into generator 4 in order to preheat the charge to the generator, to any temperature in the range below that where the gas phase becomes sufficiently conductive to cause undue current leakage between the arc electrodes. This temperature is a function both of the composition of the gas and the dimensions and particular arrangement of the reaction chamber. In typical cases, however, I prefer to omit preheating of a normally gaseous charge.

When I choose to employ as charge stock substances or mixtures of substances which are liquid at normal temperatures the use of means to convert the liquids to vapor phase is necessary. For this purpose I may employ a preheater as described for gas in the previous paragraph and feed to generator 4 a mixture of normal gases and vaporized liquid. In the event I wish to do this, I pump the liquid continuously at regulated rates into the gas stream at or near its inlet into said preheater, and adjust the heater outlet temperature by regulation of the heating means to insure that all liquid phase has been vaporized and the mixture is substantially above the dew point temperature.

In the event I wish to use liquid-phase charge stock only, as for example, when I wish to make acetylene from selected cuts of gasoline or naphtha, I omit the use of compressor 2 of Fig. 1 and substitute a suitable, externally fired or fluid-heated tubular preheater for same. The selected liquid-phase charge stock is pumped continuously at a selected rate thru the heater and is vaporized therein and superheated to a temperature preferably at least 50° above the dew point of the stock before the said stream is led into generator 4 by the functional equivalent of pipe 3 of Fig. 1.

Since the means for preheating gaseous feed stocks, or for vaporizing liquid into a gas phase before introducing into generator 4, or for vaporizing a liquid feed stock alone, are entirely conventional and are well understood by those acquainted with the art of chemical engineering, further description or a sketch of the arrangement is unnecessary.

In connection with generator 4 of Fig. 1, there are many variations of form which may be equally or more advantageous in specific circumstances. For example, but not restrictive thereto, I may add to the generator embodiment shown in Fig. 2 and 2a cooling pipes adapted to maintain a continuous flow of cooling water inside either, or both, refractory closure blocks 105 or 127, in order to maintain these refractories at a temperature level substantially lower than that which results from the arrangement of Figure 2.

It will also be understood that I may employ any convenient number of gas orifices or slots for the chamber containing the arcs, but in predetermining the number and size of slots, I prefer to use as small a diameter for the arc chamber as is mechanically feasible, and I proportion the slots to give a gas velocity therein, preferably in the range of 100–300 ft./second.

It is not necessary that the entire periphery of the chamber be provided with slots, since, in operation, the momentum of the band of cloud particles suffices to carry it past small circumferential distances over which no gas is injected into the generator chamber.

It is also obvious that I may provide any number of electric arcs in the chamber formed by the equivalent of collar 104 in Figure 2A, but I preferably use at least two arcs, and usually three, in order to insure that substantially all gas which enters the chamber is subjected to direct action of one or more arcs. When I use more than three arcs, I may find it advantageous to employ somewhat different electrode arrangements.

If I choose to use four direct current arcs in my gas conversion chamber, I may, for example, utilize an arrangement such as is shown in Fig. 2C. This figure is a plan view similar to that shown in Figure 2B. In Figure 2C, slots S3, S7, S11 and S15, have refractory sidewalls or vanes, preferably integral with a collar functionally similar to 104 of Figure 2, said vanes similar to those indicated in Figure 2, for slots S13, S3, and S6. The electrodes in the embodiment corresponding to Figure 2C are, respectively, P4 and P5, which are electrically bonded together and grounded, and P12 and P13, which are similarly connected electrically. The other electrodes are P8 and P9 and P16 and P1. The gap between each of these two pairs of electrodes is partially, or completely, filled with refractory and insulating porcelain in the form of a thick solid partition, respectively I–8 and I–16. These special partitions are adapted to isolate the electrodes on either side of the partition from each other. In Figure 2C, I have shown each of the electrodes connected to the positive terminal of a suitable source of high voltage direct current. In operation, the arcs are initiated by a probe similar to that shown and described in connection with Fig. 1, and the arcs are thereafter maintained in the chamber between P1 and P4, P5 and 8, P9 and P12, and P13 and P16.

It will be noted that in the arrangement of my conversion means, indicated by Fig. 2C, that electric arcs bridge all of the slots or gas orifices except S5 and S13, providing I completely close slots S1 and S9 between electrodes P16 and P1, and P8 and P9, with my insulating means.

It will be understood, in connection with Fig. 2C, that electrodes P4, P5, P12 and P13, are made movable by means functionally similar to that provided, for example, for P4, as shown in Fig. 2, in that electrodes P16, P1, P8 and P9, are each individually connected mechanically and electrically, similar to the arrangement shown for P1 of Fig. 2. It will also be understood that the polarity of the arcs can be reversed or arranged so that all arcs have the same polarity sequence in respect to the motion of the gas stream.

In view of the description of Figs. 2B and 2C, it will be obvious to those acquainted with the art that a large number of possible variations of the number of slots and electrode arrangements can be made in order to carry out my process, and in that I can arrange matters so that substantially any fraction of the gas slots or orifices can be bridged by arcs up to and including arrangements where all of the slots or gas orifices are bridged. Thus, for example, with an embodiment similar to Figure 2C, it is only necessary to provide suitable refractory vanes blocking gas flow thru slots S5 and S13 in order to obtain an arrangement in which all slots which pass gas are bridged by an arc.

While the arc arrangements portrayed in connection with Figures 2 and 2B and 2C are adapted to the use of direct current only, I may employ a different scheme in order to utilize alternating current arcs for my process. Taken in connection with the teachings of the description of Figures 2B and 2C, the method by which I may apply alternating current directly to the arcs in my process will be obvious from Figure 3. In the particular embodiment indicated by Figure 3, I have shown twelve slots formed by twelve partitions, P1 to P12. In respect to directing the flow of gas, these partitions are entirely similar to the refractory vanes which form the slots S1, S2, etc. in the embodiment of the generator shown in Figure 2. When I employ alternating current, however, each of these partitions is preferably made of suitable temperature resisting and electrically conducting metal, so that it may act as an electrode for an arc. While I may provide means to adjust each electrode from outside of the apparatus, as in cases for direct current arcs, I usually avoid this complication since the electrodes are consumed only very slowly in this embodiment of my invention, and adjustment during shutdown periods for other purposes is usually all that is required. Electrodes P1 and P12, P4 and P5, and P8 and P9 are advantageously electrically bonded together by suitable conductors, which conductors are all grounded. Each of the six arcs provided in the embodiment indicated by Figure 3 operate on a single phase of the three-phase alternating current, and each arc is preferably provided with two separate inductive reactances and one capacitance arranged in the form of the T-circuit, as designated by its originator, C. P. Steinmetz. This circuit will be described briefly hereinafter, but for present purposes it suffices to note that electrodes P1 and P2 form the terminals of one typical arc discharge, the electrode P1 being grounded and connected to one phase of the alternating current transformer supplying the power and the other electrode P2 being insulated from ground and provided with a conductor the same phase as is used for P1. The distance $d$, between the inner end of electrode P1 and a median portion of electrode P2 is adjusted by means of a lug, if required, such that an arc will strike automatically when potential is applied to the arc electrodes. Once the arc is formed, it is carried forward by the flow of gas thru the slot formed by electrodes P1 and P2 until it projects into the chamber as indicated in Figure 3, where it operates until the voltage in that phase drops sufficiently to extinguish the relatively long arc which then exists. Immediately thereafter the arc originates again at the point of closest approach between electrodes P1 and P2, and the new arc is forced out into the chamber by the high velocity of gas flowing thru the slot formed by the two electrodes themselves. This rapid sequence of formation, extension, and quenching of an arc takes place typically at least once in every cycle of the alternating current and may occur more often. The arrangement is preferably designed so that when any arc is extended by the gas flow to a position somewhat downstream of the point of origin, it begins to intercept the rotating cloudband of solid particles. The subsequent lengthening of the arc causes it to substantially completely operate for a fraction of a second thru the entire width of the rotating cloudband of solid particles.

The six arcs, diagrammatically indicated in Figure 3, all operate independently and in similar fashion to that just described. The arc between electrodes P3 and P4 is connected to the second phase of the power supply while that between electrodes P5 and P6 is connected to the third phase. Figure 3 illustrates between P1 and P2 at its full extension by gas flow. The arc between P3 and P4 is at an intermediate position while that between P5 and P6 has just re-established itself at the zone of closest approach of the two electrodes. In sequence, counter-clockwise, the remaining three arcs are connected to phases 1, 2 and 3, as previously indicated, and may be in correspondingly similar positions on the electrodes.

It is scarcely necessary to state that when I use alternating current arcs, I omit provision of a starting probe and accessories thereto. The refractory cover block similar to 105 of Figure 2, accordingly, has no radial slot but is made solid.

In order to prevent interference between pairs of electrically insulated electrodes P2 and P3, P6 and P7, and P10 and P11, electrically insulating partitions, X, Y and Z, are inserted between the electrodes so that no conducting path can be established between the aforesaid terminals of different phases. These special partitions, X, Y and Z, can conveniently be molded into the refractory collar corresponding to collar 104 of Figure 2, thus acting as guiding and connecting pieces for the upper and lower imperforate portions of said collar.

Where I use alternating current for the arms employed in my process, it is obviously advantageous to use 3, 6 or 9 arcs in a single chamber. In this way the phases may be balanced. It is also advantageous and practical to arrange impedances in each of the phases, so that the power factor for the supply is substantially equal to one. Methods of achieving this result are well understood in the electrical engineering field and are not subject matter of this invention.

For clarity, however, I indicate, by Figure 3A, the elements of the T-circuit previously mentioned as it is applied to one arc and one phase of the Y connected, 3-phase power supply transformer. The purpose of this circuit is to adjust the power factor, as previously mentioned, and to supply substantially sine wave current, irrespective of the voltage required at the arc to do so. While the connections for the arc between P1 and P2 only are shown, corresponding connections are provided for the arc between P7 and P8. The other arcs have similar connections to the other phases, as indicated in Fig. 3.

It will be obvious that, while I have shown only one arrangement for employing alternating current directly at the arcs for my process, many variations of this single arrangement can be made which will satisfactorily serve to treat the gas by arc action, and to heat and maintain the rotating cloud of hot particles, which is characteristic of my generating means.

In specifying arc arrangements alternative to that portrayed by Fig. 2B, I have retained the general arrangement of electrode positioning at the circumference of the cylindrical reaction chamber, shown in Fig. 2B. While this is a preferred arrangement which is well adapted to keeping the arc electrodes cool by the flow of relatively cool gas past them, it is not imperative that this arrangement be used. By more or less obvious rearrangement, I can position the electrodes thru the functional equivalent of refractory end blocks, 105 at the top, and 127 at the bottom. A combination wherein one of each pair of electrodes is positioned at the circumference as, for example, in Fig. 2, and the other passes thru the refractory corresponding in a general way to refractory block 105 is particularly advantageous in some circumstances, which will become apparent when the teachings herein are applied to specific cases.

In general I prefer to use metallic electrodes such as iron, or alloys of iron, tungsten or molybdenum of alloys of iron, and either or both of these two elements. I may, however, use carbon electrodes, in which case I provide means for relatively frequent replacement of the electrodes without the necessity of entry into the vessel thru large and heavy cover plates.

All of these alternatives and many others will be obvious to those skilled in the art of designing mechanisms of this category and the mere fact that I have chosen mechanisms for illustration which lend themselves readily to description in no wise limits me to the use of such devices to the exclusion of mechanisms which may be adapted to easier control servicing and over-all operation.

*Manufacture of acetylene from hydrocarbons*

GAS PHASE RAW MATERIAL

When I wish to apply my general processing means to the manufacture of acetylene in admixture with other gases, I find I may employ a wide range of pure or mixed hydrocarbons. Normally it is advantageous to employ the lower members of the aliphatic series of hydrocarbons, but I may employ fractions of gasoline or naphtha in the event I provide preheating means heretofore described. Choice is largely dictated by cost of raw material delivered to the point where I wish to make acetylene.

A preferred gaseous raw material for my process from the standpoint of general availability cost and reactivity for acetylene manufacture is natural gas, which is typically a high percentage of methane, together with other components in various amounts. Another preferred raw material is a mixture of methane and higher hydrocarbons such as is formed in petroleum refining operations, particularly petroleum cracking operations. In general, in order for a gas or vapor-phase hydrocarbon-containing mixture to be classed as a preferred raw material for my process, it must meet the following specifications:

a. One thousand cubic feet of the gas or vapor-gas mixture (reckoned at 60° F. and 760 mm. mercury pressure) should have at least 28.5 pounds of molecularly bound carbon.
b. The sum of the volume percents of carbon monoxide and carbon dioxide should not be greater than 2% by volume.
c. Oxygen in free form, or chemically combined in compounds other than carbon monoxide and carbon dioxide, not to exceed 0.5% by volume of gas when reckoned as free oxygen.
d. Nitrogen in free form, or chemically combined, not to exceed 2% by volume when reckoned as free nitrogen.
e. Sulphur in free or chemically bound form, not to exceed 100 grains per 1,000 cu. ft. of gas.
f. Hydrogen in free form preferably less than 10% by volume.
g. The sum of olefinic, naphthenic and aromatic hydrocarbons preferably not to exceed 10% by volume.

It will be understood that I may process hydrocarbon containing gases or vapors which do not meet the above specifications for preferred raw material. When such raw materials are available, I prefer to subject them to prior treatment adapted to bring them within the class of preferred materials prior to applying my process.

SOLID PARTICLES

I may choose to employ either nonreactive or carbonaceous and reactive solids in my process. I ordinarily prefer to use the last named substances for acetylene manufacture in order to get the advantage of reaction of solid surfaces and hydrogen, as previously described.

I preferably process either of the two classes of solid materials by grinding and classifying the particles, according to size, by conventional methods of grinding, screening and air elutriation or adaptable known forms of sedimentation in fluid systems. By these means or other adaptable and known procedures for classifying particles according to size, I make that selection of particle size which is best adapted to cause the particles to remain in the rotating cloudband in the particular embodiment of reaction chamber and arc zone, which I propose to use. It will be understood that the size range meeting this qualification is best determined by separate experimentation. While I may operate my process with a range of particle sizes with which a substantial proportion tends to leave the reaction chamber substantially immediately by way of the annular slot (138 of Figure 2A) or entrained with the gases which pass thru orifice 126 (of Fig. 2A), I prefer to utilize ranges between 20 mesh and 300 mesh and for which a high percentage tends to remain in the reaction chamber under the velocities established by the gases in operation.

It will be understood that the beneficial effects of retaining solid particles in the arc zone of my process will be obtained to a certain degree with small concentrations of suspended solids, and that this beneficial effect will increase, pass thru a maximum and then tend to decrease as the amount of solids added per unit of gas input increases. The form of the curve can only be determined by experiment with the particular feed gas, a particular size range, and varying feed rates for the particles. From experiments with cold gas where it is relatively simple to determine the solids concentration in the rotating cloudband of my apparatus, it appears that the solids concentration in the operating arc locus may be in the range of from practically zero to as much as six pounds of carbonaceous solid per cubic foot of volume of the rotating cloudband when the solids are employed which are closely sized about the average of 100 mesh.

Without in any wise asserting that the assumptions made below reflect true conditions accurately, it will be helpful to make the following calculation to gain some appreciation of the radically different conditions existing in my process for making acetylene, as compared to prior art processes.

True density of carbonaceous solid—assumed 100 lbs./cu. ft.
Specific heat in range of 2000–3000 F.—assume 0.8 (may be much higher).
Specific heat of hydrocarbon gas in range 2000–3000 F.— assumed=1.1 (methane).

If the suspended solids be thought of as displacing an equal volume of gas—which in the conventional arc without solids content would be available for heating gas outside the arc, the comparative heating effects per degree Fahrenheit change of temperature are as follows:

Volume occupied by solid (if concentration is half that given above as a maximum)=0.03 cu. ft.
B. t. u./° F. temperature change=3 (0.8)=2.4 B. t. u.
Weight of 0.03 cu. ft. (methane) at 2500 F. (Atmospheric pressure assumed)=0.058 lbs.
B. t. u./° F. temperature change, 0.058 (1.1)=0.064
Ratio 2.4/0.064=37.4

Under these assumptions it is evident that the solid particles carried outside the locus of the arc give up 37 times as much heat per degree Fahrenheit temperature lowering as would the same volume of displaced gas. The figures crystallize the meaning of the previous discussion in which the particles were said to effect an "increase of active reaction volume."

If the 100 mesh particles are all assumed to have an equivalent (spherical) diameter of 0.005 inch, the total surface, exposed for reaction, per cubic foot of "cloud band" may be calculated to be about 113 sq. ft, and it is readily apparent why substantial reaction between the gas and a reactive solid can be effected, particularly when it is borne in mind that the true surface of particles is vastly larger, on account of surface irregularities, than that which has been calculated.

While the intrinsic accuracy of these assumptions and calculations are not high, the order of the results is illuminating and their nature points up the reason why substantially different results accrue to my process as compared to processes of the prior art.

REFRACTORY SOLIDS

As refractory solids for my process for acetylene manufacture, I may choose from among such materials as zirconia, silicon carbide, relatively pure alumina, magnesia, or refractories solids having a high percentage of chromium oxide. An essential criterion of a satisfactory nonreactive solid is that particles thereof do not tend to soften to an extent, which causes them to partially fuse or agglomerate under the conditions maintained in my process. As between two materials, both of which are satisfactory from the standpoint of fusion and agglomeration temperatures, I usually prefer to use the more dense material, since it may be more finely subdivided than the former and still tend to remain in the locus of the rotating cloudband of solid particles in operation of my process.

CARBONACEOUS SOLIDS

When I purpose to use reactive solids in my process for acetylene manufacture, I usually choose a material from the group which includes coke, anthracite coal or charcoal, preferably meeting the specifications,

| | |
|---|---|
| Volatile matter | 8% or less by wt. |
| Sulphur | 0.6% or less. |
| Ash | 11.0% or less. |
| Ash fusion point | 2500° F. or more, preferably 2900° F. |
| Chlorine and phosphorus | Minimal. |
| Chemically bound water | Minimal. |

The materials are preferably dried to minimum water content after grinding and classifying to obtain a preferred range of size.

While it may, in particular cases, be distinctly advantageous to use carbonaceous materials such as bituminous or sub bituminous coal having substantially higher than 5% to 8% volatile content in my process for acetylene manufacture, it is obvious that the large variety of compounds which may volatilize from such coals, coupled with the fact that these substances react in the arc zone, makes it impossible to generalize as to the relative value of these materials in my process. Experiments using a particular material in my process are necessary to appraise its utility.

If I substitute other gases for the hydrocarbon-containing gases which I employ to make acetylene, I can make other products by my general process, involving arc action in the presence of solid particles retained therein.

Nitric oxide manufacture

For example, I may employ air as the gas phase in place of hydrocarbons and use in my generation means refractory solid particles like those specified under acetylene manufacture, in order to make a product gas which contains substantial quantities of nitric oxide.

Acetylene manufacture from hydrogen

I may also manufacture acetylene in admixture with hydrogen by replacing the hydrocarbon containing gas phase, previously specified for acetylene manufacture, by substantially pure hydrogen and employing therewith the reactive carbonaceous solid particles as specified heretofore. When I practice this method of acetylene manufacture, the chief reaction involved appears to be reaction number 3.

Acetylene manufacture from mixtures of hydrocarbons and hydrogen

In connection with the discussion of acetylene manufacture from hydrocarbon gas mixtures, a limit of 10% by volume of free hydrogen was indicated desirable. Yet, as mentioned in the paragraph just above, acetylene can be manufactured from substantially pure hydrogen. Hereinbefore, recycling of hydrogen made in the process to hydrocarbon gas feed stock was indicated as desirable. The three statements all relate to the fact that when free hydrogen is present in my conversion means, together with hot carbonaceous particles, acetylene is formed. The choice of a gaseous raw material containing hydrocarbon plus any specific percentage of hydrogen from traces up to and including substantially 100 per cent hydrogen is largely a question of economics. Factors such as the producing capacity of the equipment per unit of time, the combination of the cost of gas, solid carbonaceous substance and the cost of electric power required per unit weight of acetylene produced enter into the determination of the most advantageous mixture of gases to use. I usually find it advantageous to acquire hydrocarbon gas having less than 10% hydrogen by volume as already specified. Thereafter, if and when I choose to employ as feed gas for my process, a gas with higher free hydrogen content, I prefer to admix hydrogen obtained from separation steps applied to products previously made by my process. By utilizing this procedure less source gas is required per unit of acetylene produced. It is obvious, however, that, under specific conditions and costs for source gas, and for the recovery of hydrogen from my products, it may be advantageous to acquire a source gas with a larger percentage of hydrogen than is typically preferable. The statement may apply to gas with very much higher hydrogen content, up to and including a gas which is substantially 100% hydrogen, together with traces of hydrocarbons, if any.

Manufacture of acetylene and hydrocyanic acid

My process and apparatus are also adapted to manufacture of acetylene, together with substantial proportions of hydrocyanic acid made by intent rather than as the result of the presence of minor amounts of free or chemically bound nitrogen in the gas and/or solids fed to my process.

To carry out this manufacture, I employ reactive carbonaceous particles of the character preferred for acetylene manufacture and, as one of the two gaseous raw materials, I prefer to use hydrocarbons meeting the specification for same preferred for acetylene manufacture. As the second raw material, I may employ ammonia gas or alternately nitrogen, substantially free of oxygen. The acetylene produced probably results from the reactions previously discussed, while the hydrocyanic acid is probably formed by one or more of the following reactions which are known to proceed in simple laboratory systems in which an arc acts on pure gases.

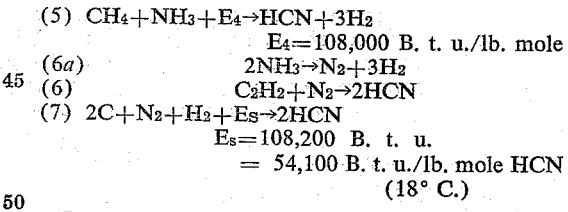

(5) $CH_4 + NH_3 + E_4 \rightarrow HCN + 3H_2$
$E_4 = 108{,}000$ B. t. u./lb. mole
(6a) $2NH_3 \rightarrow N_2 + 3H_2$
(6) $C_2H_2 + N_2 \rightarrow 2HCN$
(7) $2C + N_2 + H_2 + E_8 \rightarrow 2HCN$
$E_8 = 108{,}200$ B. t. u.
$= 54{,}100$ B. t. u./lb. mole HCN
(18° C.)

I may operate my process, using two modes of introduction of the gaseous raw material. In the first mode, I thoroughly admix the ammonia and hydrocarbon gas before introducing them into my generator thru a pipe functionally equivalent to pipe 3 of Figure 1. In the second mode of carrying out my invention, I lead only the hydrocarbon gas into the generator by a pipe functionally equivalent to pipe 3 of Figure 1, and I provide a second pipe to convey ammonia, to a position close to the interior end of one or more gas slots, such as slots S2 of Figure 2C. My purpose is to introduce a large proportion of the ammonia to the reaction chamber in a zone downstream from that in which the arcs act directly on the hydrocarbon gas. Accordingly, I omit, or do not use, the arc next after the point of introduction of the stream of ammonia. In using an embodiment of my invention, similar to 2C, I accordingly preferably disconnect P1 from the source of power so that no arc plays between P1 and P4. By this arrangement, I am able to introduce ammonia into and thru the rotating band of hot carbon particles, which preheat it without passing any substantial portion thereof directly thru an arc, since the ammonia gas, once it has passed thru the cloudband, largely circulates around the chamber in a spiral path of radius smaller than that corresponding to the radial distance of the arcs between electrodes P5 and P8, P9 and P12, and P13 and P16. I may choose to preheat the ammonia stream in tubular heaters exterior to my generator to a temperature in the range of 300–1000 degrees F. prior to its introduction to the generator by this mode.

While I have described this mode of introduction of ammonia into the reacting system by means of Figure 2C, it will be obvious that other slot and arc arrangements can be adapted to achieve the same purpose, which is to introduce, and mix hot ammonia largely with the highly heated reaction products of the arcs rather than to force the ammonia to pass in admixture with the raw materials directly thru an arc.

When I employ this second mode of introduction of ammonia, it appears that much of the heat required for the decomposition of ammonia into nitrogen and hydrogen in the sense of Equation 6A, and the additional heat necessary for recombination of hydrogen, nitrogen and carbon to hydrocyanic acid in the sense of Equation 7, is obtained either from the sensible heat of cooling of the products of direct arc action, or possibly by the evolution of heat due to the decomposition of acetylene already formed into secondary hydrogen and secondary carbon molecules.

It may well be that other mechanisms account for the actions which occur when I use my second mode of introduction of ammonia, but the important economic fact is that the amount of energy introduced into the arcs per pound of acetylene in the end products is not substantially different from that required to produce the same amount of acetylene only when ammonia is not introduced into the system. Stated otherwise, it does not appear that any substantial amount of additional energy is required for forming the hydrocyanic acid product over and above that which would be required without production of same.

The importance of quickly lowering the temperature of high temperature product gases, containing acetylene in order to reduce decomposition thereof to secondary hydrogen and secondary carbon has already been mentioned. It may be that the main advantage of my second mode of introduction of ammonia resides in the circumstance that the heat absorption to decompose ammonia and to form hydrocyanic acid from the decomposition products and carbon reduces the temperature of the gases leaving the arcs with great rapidity and effectiveness.

As indicated by Equation 5, when I employ either mode of introducing ammonia into my reaction system, decomposition of same will produce hydrogen in excess of that necessary for complete utilization of the nitrogen in hydrocyanic acid. This excess hydrogen in and about the locus of the arcs and in contact witth the hot carbonaceous particles in the cloudband of my apparatus, particularly when I employ the first mode for introduction of ammonia, is available for reacting with said carbon and forming more acetylene (or hydrocyanic acid) than would otherwise be obtained.

It will be obvious to those acquainted with the art, and in view of the relationships which I have described, that I may use relatively wide ranges in the proportions of ammonia gas and hydrocarbon gas in either mode of operation and still achieve my purpose of simultaneous manufacture of acetylene and hydrocyanic acid. I usually prefer, when I employ the first mode of operation, to use mixtures of ammonia and hydrocarbon gas in a range of from 1 to 10 volume parts of ammonia to 10 parts by volume of hydrocarbon. When I limit the ammonia to 1 to 2 parts per 10 parts of hydrocarbon gas, a major portion of the nitrogen in the ammonia combines to form hydrocyanic acid.

Where I employ my second mode of introduction of ammonia, I usually prefer to add 1 to 3 volume parts of ammonia to 10 volume parts of hydrocarbon gas introduced as raw material, though substantially larger amounts of ammonia may be used at the expense of increasing amounts of unreacted ammonia with final product gases.

As an alternative process for the production of substantial amounts of hydrocyanic acid admixed with acetylene, I may add substantially pure nitrogen to the hydrocarbon gas and pass the mixtures thru the functional equivalent of pipe 3, in order to provide nitrogen for the formation of hydrocyanic acid in and about the locus of the arcs in my reaction chamber. In the event I use this process, the carbon for the molecules of hydrocyanic acid doubtless comes in part from decomposition of acetylene, as portrayed by reaction 6 and in part from direct action of nitrogen and hydrogen on hot carbon particles in and about the locus of the arcs, as indicated by Equation 7.

While I may also add nitrogen to the reacting system, according to the same mode described as the second mode for introduction of ammonia, I prefer, where I add nitrogen alone, to employ the first mode of addition. I usually add nitrogen in the range of ratios between 0.1 and 0.05 part of nitrogen per volume part of hydrocarbon gas employed.

Another process which I may carry out by application of my conversion means produces substantial quantities of hydrocyanic acid and/or ammonium cyanide, together with acetylene, but avoids the use of hydrocarbon gases entirely. To carry out this process I conduct ammonia vapors, or alternately ammonia vapors intermixed with substantially pure nitrogen into my reactor by a pipe which is the functional equivalent of pipe 3 of Figure 1, and introduce reactive carbonaceous particles into the generator to form the cloudband in my generator. The reaction which occurs apparently may be represented by the Equation 5, below.

(8) 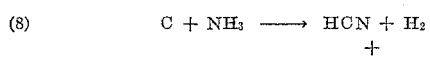

(9) 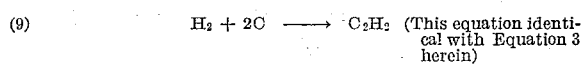

The high temperature carbonaceous particles circulating in the cloudband of my apparatus contribute to the decomposition of ammonia with formation of hydrocyanic acid and hydrogen. A portion of this hydrogen tends, in turn, to combine with the carbon to produce acetylene under the temperature conditions in the arc. When nitrogen is used in admixture with ammonia as the gaseous raw material for my process, a certain typically small percentage of same, together with the excess hydrogen from ammonia decomposition, and the high temperature carbon in the rotating cloudband likewise combines to form hydrocyanic acid gas, so that the final product mixture flowing in the pipe which is functionally equivalent to pipe 162 of Fig. 1 is composed of nitrogen, hydrogen, acetylene and hydrocyanic acid, together with more or less ammonia, depending on whether or not the decomposition of this element of raw materials in the generator was complete.

When I employ any one of these new processes to produce substantial amounts of hydrocyanic acid admixed with acetylene, I preferably avoid the use of direct water contact cooling means, as shown in Fig. 1, by item 163, and substitute therefor tubular coolers to cool the product gases and condense water from same. The condensate is collected, and separated from the gas and is subsequently freed of its volatile content, including ammonia and hydrocyanic acid, by heating the condensate to boiling temperature. The gases evolved thereby are added to the main stream of gas flowing into the tubular cooling equipment. The product gas stream from the tubular coolers is subsequently subjected to procedures adapted to isolate the components in required purities.

In the preceding discussion of the solid particles which I may choose to employ in carrying out processes of the character described, I have referred to two general classes of solids, one, refractory materials which appear to exert their action principally by providing for thermal cracking effects not heretofore obtained in processes using the electric arc, and two, carbonaceous solids which provide for both thermal cracking and direct chemical reaction effects.

The over-all reactions which may be obtained with either class of solids employed in my processes may be substantially influenced by constituents in the solids which exert catalytic effects not heretofore identified and classified as such. For example, the carbonaceous substances which I preferably use invariably contain appreciable percentages of substances such as iron, calcium, phosphorus, chlorine, sulphates and the like in varying amounts. It is known that at substantially lower temperatures traces of iron favorably influence the reaction between hydrogen and coal substance to form hydrocarbons and it may be that mechanisms in this category are at least some of the intermediate reactions which ultimately yield the end products of my processes. It will be understood that it is difficult to differentiate between catalytic effects which are properly so classified and effects due to fusion on the surfaces of the residues of added materials under the extremely high temperatures obtaining in the arc. Such incorporation with the surfaces which occurs when I employ addition reagents which are not completely and immediately vaporized in the arcs naturally alters the extent and the heat capacity of the surface layers of the solids to mention obvious physical changes which might well change the thermal cracking, as well as the true chemical reactiveness of the surfaces.

It will be understood that in the prior art of utilization of electric arcs to effect molecular rearrangements, no opportunity has been presented to utilize catalytic effects such as may be obtained by the use of my processes. In order to obtain such effects, it is necessary to retain the catalytic substances in the zone of arc so that they may be heated and become effective at high temperatures.

In order to obtain catalytic effects in my processes, I may impregnate the particles prior to their application in my process with solutions or suspensions of metal salts or oxides which leave residues having vapor pressures less than one atmosphere pressure at temperatures of the order of 2,000° F. After impregnation, the particles are dried and may either be applied directly in my process, or I may prefer to subject them to a selected high temperature to convert the compounds to a more stable form on the surface of the solids before I introduce the particles into my process. Among the compounds which I may employ in water solution or suspension to impregnate the solid particles are iron hydroxide (10% suspension); calcium acetate (10% solution); copper sulphate (10% solution); calcium chromate (10% solution), said percentages being weight percents.

What I claim and desire to secure by Letters Patent is:

1. The process of subjecting a gas and solid particles suspended therein to the action of the electric arc which comprises the steps of passing the gas into a gas confining chamber continuously at a regulated rate, maintaining at least one electric arc in said chamber, adding solid particles of predetermined size at a regulated rate to suspend said particles discretely in said gas, imparting differing velocities to said gas and to said particles to force a substantial fraction of the total number of said suspended particles to repeatedly traverse at least part of the locus of said electric arc, and removing the gas phase and solids from the chamber.

2. The process of subjecting a gas and solid particles suspended therein to the action of an alternating current electric arc which comprises the steps of passing the gas into a gas confining chamber continuously at regulated rate, cyclically maintaining at least one electric arc in said chamber, adding solid particles of predetermined size at a regulated rate to suspend said particles discretely in said gas, imparting differing velocities to said gas and to said particles to force a substantial fraction of the total number of said particles to repeatedly traverse at least part of the locus of said alternating current electric arc established cyclically and projected among the particles, and removing gas phase and solids from the chamber.

3. The process of subjecting a gas phase and solid particles suspended therein to the action of an electric arc which comprises maintaining at least one electric arc in operation in a gas retaining chamber, feeding said gas phase continuously at regulated rate into said chamber, adding solid particles of predetermined size at a regulated rate to suspend said particles discretely in said gas phase, channeling the flow of the mixed phases to establish a field of centrifugal forces whereby a substantial number of the higher density suspended particles repeatedly traverse at least part of the locus of said electric arc while the lower density gas stream passes forward and away from the locus of said arc without substantial recycling thereto, and removing the treated gas phase and solid particles not retained in circulation in said chamber.

4. The process of subjecting a gas to the action of an electric arc which comprises the steps of continuously feeding the gas at a regulated rate into a chamber at a velocity to produce vortical flow in said chamber, introducing solid particles of predetermined size at a regulated rate into said vortex whereby a substantial fraction of said particles centrifugate, congregate discretely and circulate in suspension about the axis of the vortex in an outer zone thereof, maintaining a substantial portion of at least one electric arc in at least a portion of said outer zone of said vortex and repeatedly passing a substantial number of said circulating particles through said electric arc, and continuously removing from said chamber the gas phase and solid particles not retained in the said vortex.

5. The process of subjecting a gas to the action of an alternating current electric arc which comprises the steps of continuously feeding the gas into a chamber at a velocity to produce vortical flow in said chamber, introducing solid particles of predetermined size at a regulated rate into said vortex whereby a substantial fraction of said particles centrifugate, congregate discretely and circulate in a suspension about the axis of the vortex in an outer zone thereof, cyclically establishing at least one electric arc and projecting same in at least a portion of the outer zone of said vortex and repeatedly passing a substantial number of said circulating particles through said electric arc and continuously removing from said chamber the gas phase and solid particles not retained in said vortex.

6. The process of subjecting a gas phase and solid particles suspended therein to the action of an electric arc which comprises feeding a gas continuously at regulated rate into a gas retaining chamber with axial outlet, feeding solid particles of predetermined size and at regulated rate into said chamber to suspend said particles in said gas, channeling the flow of the mixed phases to establish opposing centrifugal and gas frictional forces on each particle to substantially increase the concentration of the particles in the suspension in a zone removed from the walls of the chamber, maintaining at least one electric arc in the midst of the zone of particle concentration and removing from the chamber gaseous product and particles not retained in the zone of concentration of particles in said chamber.

7. The process of subjecting a gas to the action of an electric arc which comprises the steps of continuously feeding the gas at a regulated rate into a chamber at a velocity to produce vortical flow in said chamber, introducing solid particles of predetermined size at a regulated rate into said vortex whereby a substantial fraction of said particles centrifugate, congregate discretely and circulate in suspension about the axis of the vortex in an outer zone thereof, maintaining a substantial fraction of at least one electric arc in a portion of said outer zone of said vortex and repeatedly passing a substantial number of said circulating particles through said electric arc, continuously removing from said chamber the gas phase and solid particles not retained in the said vortex, and reducing the temperature thereof substantially below that of the gas phase at the zone of removal from the chamber.

8. The process of subjecting a gas to the action of an electric arc which comprises the steps of continuously feeding the gas into a chamber at a velocity to produce vortical flow in said chamber, introducing solid particles of predetermined size at a regulated rate into said vortex whereby a substantial fraction of said particles centrifugate, congregate discretely and circulate in suspension about the axis of the vortex in an outer zone thereof, maintaining a substantial portion of at least one electric arc in a portion of said outer zone of said vortex and repeatedly passing a substantial number of said circulating particles through said electric arc, continuously removing from said chamber the gas phase and solid particles not retained in the said vortex and substantially immediately commingling water with the said gas phase and suspended solids to evaporate at least the major portion of said water and reduce the temperature of the resulting mixture to below 750° F.

9. The process of producing acetylene in admixture with other gases by the action of an electric arc which comprises the steps of continuously feeding a hydrocarbon containing gas into a chamber at a velocity to produce vortical flow in said chamber, introducing solid particles of predetermined size at a regulated rate into said vortex whereby a substantial fraction of said particles centrifugate, congregate discretely and circulate in suspension about the axis of the vortex in an outer zone thereof, maintaining a substantial portion of at least one electric arc in a portion of said outer zone of said vortex and repeatedly passing a substantial number of said circulating particles through said electric arc, and continuously removing from said chamber the gas phase and solid particles not retained in the said vortex and substantially immediately commingling water with the said gas phase and suspended solids to reduce the temperature of the resulting mixture of gas and water vapor substantially below that of the gas phase removed from said chamber and avoid substantial further chemical reaction.

10. The process of claim 9 in which the hydrocarbon containing gas fed to the chamber is natural gas and the solid particles introduced are substantially non-reactive refractory particles.

11. The process of claim 9 in which the hydrocarbon containing gas fed to the chamber is natural gas and the solid particles introduced are substantially composed of a carbonaceous substance selected from the group consisting of coke, anthracite coal, bituminous coal, sub-bituminous coal and charcoal.

12. The process of claim 9 in which the hydrocarbon containing gas fed to the chamber is substantially composed of hydrocarbons having less than six carbon atoms per molecule and the solid particles introduced are substantially non-reactive refractory particles.

13. The process of claim 9 in which the hydrocarbon containing gas fed to the chamber is substantially composed of hydrocarbons having less than six carbon atoms per molecule and the solid particles introduced are comminuted substance selected from the group consisting of coke, anthracite coal, bituminous coal, sub-bituminous coal and charcoal.

14. The process of claim 9 in which the gas fed into the chamber contains hydrogen and the solid particles are comminuted substance selected from the group consisting of coke, anthracite coal, bituminous coal, sub-bituminous coal and charcoal.

15. The process of producing hydrogen cyanide in admixture with other gases by the action of the electric arc which comprises the steps of continuously feeding into a chamber at a velocity to produce vortical flow in said chamber a nitrogen containing gas phase and a hydrocarbon containing gas phase in predetermined ratio, introducing solid particles of predetermined size at a regulated rate into said vortex whereby a substantial fraction of said particles centrifugate, congregate discretely and circulate in suspension about the axis of the vortex in an outer zone thereof, maintaining a substantial portion of at least one electric arc in a portion of said outer zone of said vortex and repeatedly passing a substantial number of said circulating particles through said electric arc, continuously removing from said chamber the gas phase and solid particles not retained in the said vortex and substantially immediately reducing the temperature thereof substantially below that of the products emerging from the chamber.

16. The process of claim 15 in which the nitrogen containing gas phase introduced into the chamber is predominantly composed of free nitrogen, and the hydrocarbon containing gas phase introduced into the chamber is substantially composed of hydrocarbons having less than six carbon atoms per molecule.

17. The process of claim 15 in which the solid particles introduced into the chamber are comminuted substance selected from the group consisting of coke, anthracite coal, bituminous coal, sub-bituminous coal and charcoal.

18. The process of claim 15 in which the nitrogen containing gas phase introduced into the chamber is predominantly composed of free nitrogen, and the hydrocarbon containing gas introduced into the chamber is natural gas and the solid particles introduced into the chamber are comminuted substance selected from the group consisting of coke, anthracite coal, bituminous coal, sub-bituminous coal and charcoal.

19. The process of claim 15 in which the nitrogen containing gas phase introduced into the chamber is substantially composed of free ammonia and the hydrocarbon containing gas phase introduced into the chamber is substantially composed of hydrocarbons having less than six carbon atoms per molecule.

20. The process of claim 15 in which the nitrogen containing gas phase introduced into the chamber is substantially composed of free ammonia and the hydrocarbon containing gas phase introduced into the chamber is substantially composed of hydrocarbons having less than six carbon atoms per molecule and the solid introduced into the chamber is comminuted substance selected from the group consisting of coke, anthracite coal, bituminous coal, sub-bituminous coal and charcoal.

21. The process of claim 15 in which the nitrogen containing gas phase introduced into the chamber contains ammonia and the hydrocarbon gas phase introduced into the chamber is substantially composed of natural gas.

22. The process of claim 15 in which the nitrogen containing gas phase introduced into the chamber is substantially composed of nitrogen and the hydrocarbon containing gas phase is substantially composed of natural gas.

23. The process of producing nitric oxide by means of the process of claim 7 in which the gas fed to the chamber is air and the solid particles introduced to the chamber are substantially non-reactive refractory particles.

24. An apparatus for continuously reacting a gas phase in passage through a zone of high concentration of suspended solid particles retained in said zone by the action of centrifugal forces which comprises a gas chamber of circular cross-section having an axial outlet, a plurality of convergent gas inlet ports spaced about the periphery of said chamber and arranged with the axis of each port at an angle not greater than 16 degrees with the respective tangent plane, means to introduce and regulate the flow of a stream of solid particles into at least one of said inlet ports, at least one pair of electrodes positioned at, and spaced around the periphery of the said chamber, means to initiate and to maintain an electric arc between said electrodes and in the path of the particles which are impelled to traverse a circular path near the periphery of said chamber, means to direct at least a portion of the gas entering the said chamber in an upward direction to oppose the action of gravity on said suspended particles, a slot in the base of the said chamber near its periphery and in communication with means to collect solids outside said chamber while avoiding substantial outward flow of gas through said slot, and means to cool the gas phase and solids emerging from said chamber.

25. An apparatus for repeatedly passing solid particles through an electric arc while same are in suspension in a gas phase which comprises a chamber of circular cross-section and having an axial outlet, a plurality of ducts spaced about the circumference of said chamber and arranged to direct predetermined streams of gas into said chamber at predetermined angles not exceeding 16 degrees with the tangent to the cross-section at the point of entry, means to introduce solid particles at regulated rate into at least one of said ducts, means to introduce gas phase simultaneously through all of said ducts at a velocity to establish an annular zone of high concentration of suspended particles in circulation about the axis of the chamber near the periphery thereof, at least one pair of electrodes positioned at the periphery of said chamber, means to initiate and maintain an electric arc in at least a portion of the path of said particles thereby repeatedly subjecting the particles to direct and intense heating by the arc while the gas phase flows continuously toward the outlet, and means to cool the gas and solid particles not retained in the zone of particle concentration.

References Cited in the file of this patent

UNITED STATES PATENTS

| | | |
|---|---|---|
| 1,018,990 | Rothe | Feb. 27, 1912 |
| 1,028,516 | Wielgolaski et al. | June 4, 1912 |
| 1,232,179 | Barfoed | July 3, 1917 |
| 1,634,311 | Thomas | July 5, 1927 |
| 1,902,351 | Baumann et al. | Mar. 21, 1933 |
| 2,002,003 | Eisenhut et al. | May 21, 1935 |
| 2,165,820 | Smyers | July 11, 1939 |